US010110584B1

(12) United States Patent
Schmoyer et al.

(10) Patent No.: US 10,110,584 B1
(45) Date of Patent: *Oct. 23, 2018

(54) ELEVATING TRUST IN USER IDENTITY DURING RESTFUL AUTHENTICATION AND AUTHORIZATION

(71) Applicant: Jericho Systems Corporation, Dallas, TX (US)

(72) Inventors: Timothy Schmoyer, Harvard, MA (US); Michael Dufel, Boulder, CO (US); David Staggs, Austin, TX (US); Vijayababu Subramanium, Columbia, SC (US)

(73) Assignee: JERICHO SYSTEMS CORPORATION, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/266,096

(22) Filed: Sep. 15, 2016

Related U.S. Application Data

(63) Continuation of application No. 14/506,825, filed on Oct. 6, 2014, now Pat. No. 9,485,248, which is a continuation of application No. 13/844,622, filed on Mar. 15, 2013, now Pat. No. 8,893,293.

(60) Provisional application No. 61/691,248, filed on Aug. 20, 2012.

(51) Int. Cl.
*H04L 29/06* (2006.01)

(52) U.S. Cl.
CPC .......... *H04L 63/08* (2013.01); *H04L 63/0428* (2013.01); *H04L 63/10* (2013.01); *H04L 63/20* (2013.01); *H04L 67/42* (2013.01)

(58) Field of Classification Search
CPC ....................................................... G06F 21/33
USPC ............ 726/1, 7, 14; 713/180–182; 455/558
See application file for complete search history.

(56) References Cited

U.S. PATENT DOCUMENTS

| | | | | |
|---|---|---|---|---|
| 7,631,346 B2* | 12/2009 | Hinton | ............... | H04L 63/0815 380/279 |
| 8,528,043 B2* | 9/2013 | Hu | ....................... | G06Q 10/063 709/205 |
| 8,990,699 B2* | 3/2015 | Pugh | ....................... | G06F 21/41 715/738 |
| 9,009,787 B2* | 4/2015 | Nimashakavi | ...... | H04L 63/0807 726/2 |
| 9,037,711 B2* | 5/2015 | Maida-Smith | .......... | H04L 63/20 709/204 |
| 9,684,886 B2* | 6/2017 | Cui | ....................... | G06Q 10/10 |
| 2003/0182579 A1* | 9/2003 | Leporini | ................ | H04N 5/913 713/150 |
| 2006/0053296 A1* | 3/2006 | Busboom | .............. | H04L 63/083 713/182 |
| 2009/0235349 A1* | 9/2009 | Lai | ....................... | H04L 9/3213 726/14 |
| 2012/0054625 A1* | 3/2012 | Pugh | ....................... | G06F 21/41 715/736 |

(Continued)

*Primary Examiner* — Morshed Mehedi
*Assistant Examiner* — Viral S Lakhia

(57) ABSTRACT

Credentials sent over a back channel during the authentication of a user to a RESTful service can elevate the trust the recipient system can place in the user's identity. The addition of an identity credential of higher strength can increase confidence in user identities electronically presented with a lower strength credential. Attributes from either credential can be used to determine authorization to a protected resource.

16 Claims, 14 Drawing Sheets

(56) References Cited

U.S. PATENT DOCUMENTS

| | | | | |
|---|---|---|---|---|
| 2012/0216244 A1* | 8/2012 | Kumar, Sr. | ............. | G06F 21/57 |
| | | | | 726/1 |
| 2012/0231844 A1* | 9/2012 | Coppinger | ......... | G06Q 20/3278 |
| | | | | 455/558 |
| 2013/0125226 A1* | 5/2013 | Shah | ................... | H04L 63/0815 |
| | | | | 726/7 |
| 2014/0047351 A1* | 2/2014 | Cui | ........................ | G06Q 10/10 |
| | | | | 715/744 |

* cited by examiner

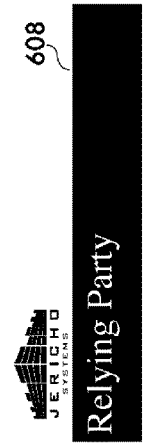
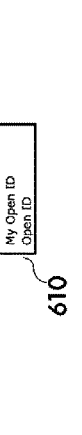
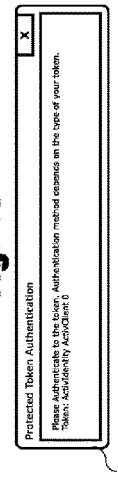
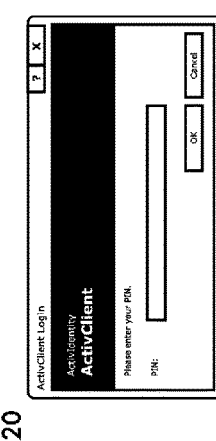
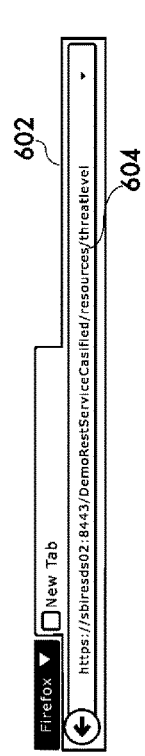
Fig. 6A
Fig. 6B
Fig. 6C
Fig. 6D

ELEVATING TRUST IN USER IDENTITY DURING RESTFUL AUTHENTICATION AND AUTHORIZATION

PRIORITY

This application is a continuation of U.S. patent application Ser. No. 14/506,825, filed Oct. 6, 2014, now allowed, which is a continuation of U.S. patent application Ser. No. 13/844,622 (now U.S. Pat. No. 8,893,293), filed Mar. 15, 2013, entitled "Elevating Trust in User Identity During RESTful Authentication." This application claims priority to and incorporates by reference U.S. provisional application 61/691,248, filed Aug. 20, 2012, entitled "Methods and Apparatuses for Authentication and Authorization."

FIELD OF THE INVENTION

The specification relates the authentication of entities (which can be persons or non persons) to RESTful services.

BACKGROUND OF THE INVENTION

Authentication comprises the verification of the identity of a user, process, or device, often as a prerequisite to allowing access to resources in an information system. (see: NIST IR 7298 Revision 1, Glossary of Key Information Security Terms.) Authorization comprises access privileges granted to a user, program, or process or the act of granting those privileges.

Representational State Transfer (REST) is a communications style that allows a client machine, for example a computer running a Web browser, to communicate to a server, for example a computer running a service. Client-server communication is "stateless" between requests, meaning each REST interaction typically contains the information for a component to understand the message. REST is considered a "lightweight" protocol suitable for distributed hypermedia systems. In the REST style, a data object is uniquely named using a Uniform Resource Identifier (URI). The REST style uses operations such as GET, PUT, POST, HEAD, and DELETE. The REST style is loosely coupled, does not require a message header, human readable, and stateless between requests. Other characteristics of REST are described in chapter 5 of the doctoral dissertation of Roy Fielding "Architectural Styles and the Design of Network-based Software Architectures," University of California, Irvine. REST was initially described for use with Hypertext Transfer Protocol (HTTP) but is not limited to that protocol. Because REST works well for distributed, collaborative, hypermedia information systems, it has become a popular approach for supporting the World Wide Web (WWW).

REST Web services are resources accessed by users through, for example, a Web browser. RESTful Web services allow simpler application development and are ideal for interaction with Web browsers via JavaScript or AJAX. REST has become the predominant Web service design, favored by mainstream Web service providers such as Facebook, Google, and Yahoo. Information passed in a REST request is described as "front-channel" exchange.

Security Assertion Markup Language (SAML) is an XML-based standard ratified by the Organization for the Advancement of Structured Information Standards (OASIS) that defines the syntax and semantics of SAML assertions and tokens as well as protocols used to request and transmit those assertions between systems. SAML assertions can be used for exchanging authentication and authorization data from a trusted provider to a relying party. A SAML assertion comprises a package of information that supplies zero or more statements made by a SAML authority. (see: OASIS Security Assertion Markup Language (SAML) v2.0 (March 2005)) The integrity of assertions can be protected by cryptographic techniques, such as encryption of the assertion, encryption of a part of a SOAP message, use of SOAP message security, use of a SAML token, or other enveloping technique. SAML profiles describe how SAML tokens or SAML assertions can be passed by value or by reference.

SOAP, originally named for the term Simple Object Access Protocol and ratified by the World Wide Web Consortium (W3C), is a protocol for exchanging structured information. SOAP is frequently used as the messaging framework in the implementation of Web Services in computer networks. SOAP messages are XML encoded and are considered "heavyweight" comprising an envelope with a header and body therein.

OpenID® (OpenID Foundation Corp., Portland, Oreg.) is an authentication profile that provides a standardized way of authenticating a user, for example of a web browser, using credentials provided by an OpenID provider. Websites must be specifically configured to accept OpenID credentials, for example by using an authentication filter that recognizes the authentication protocol. Central Authentication Service (CAS) can be used to implement authentication protocols. Users register at an OpenID provider and are provided with an identifier, typically a Uniform Resource Locator (URL). During authentication, for example to a web site, the user provides the OpenID identifier to the relying party. The relying party redirects the browser to the OpenID provider, which authenticates the user and confirms the identity of the user for the relying party.

BRIEF SUMMARY OF THE INVENTION

The invention described herein comprises the exchange of attributes that may be used during the authentication and/or authorization of an entity to a RESTful web service. Attributes used in authentication to the RESTful service are not all passed in the request to the RESTful service, i.e., "front-channel" exchanges. Described herein is a methodology of using a secure "back channel" assertion exchange that can use, for example, a SAML token or a SAML assertion.

DESCRIPTION OF THE DRAWINGS

FIGS. 6A-6D show a representation of example Graphical User Interfaces (GUIs) which may be used. Specifically, FIG. 6A shows use of a browser to access a REST service, FIG. 6B shows use of a GUI to select an OpenID provider, FIG. 6C shows use of a GUI to specify specific attributes for retrieval, and FIG. 6D shows use of a GUI during smartcard authentication.

DETAILED DESCRIPTION

The invention comprises secure authentication and/or authorization of users communicating over REST, for example, using a web browser. An example supports the secure authentication and authorization of requests made to a RESTful service from a user through an agent, for example a browser. A RESTful service can be configured to augment the user request for a service made using a REST architectural style and provide secure authentication and, optionally, authorization capabilities.

In general, "front channel" refers to passing the SAML assertion or token along with the message requesting a service. In general, "back channel" comprises a direct communication between two system entities without "redirecting" messages through another system entity, for example an HTTP client (e.g. user agent). In general, a back channel exchange passes at least some of the information, which may be attributes, separately from the message requesting a service. Attributes define, classify, or annotate the datum to which they are assigned. For example, a user of a RESTful service could hold an attribute "clearance" assigned to the value "top secret." An example implementation uses OpenID Authentication 2.0 protocol and CAS. CAS is available from Jasig, an incorporated, non-profit, 501(c)3 organization. In this document, "RESTful" refers to a communications style comprising one or more REST characteristics described above. For example a communications style comprising data objects that are uniquely named using a Uniform Resource Identifier (URI) and are exchanged in human-readable form. Another example being a communications style that is loosely coupled, does not require a message header, human readable, and stateless between requests. Another example being a communications style that comprises uses operations such as GET, PUT, POST, HEAD, and DELETE and is sent in a human readable message format.

Figure 1:
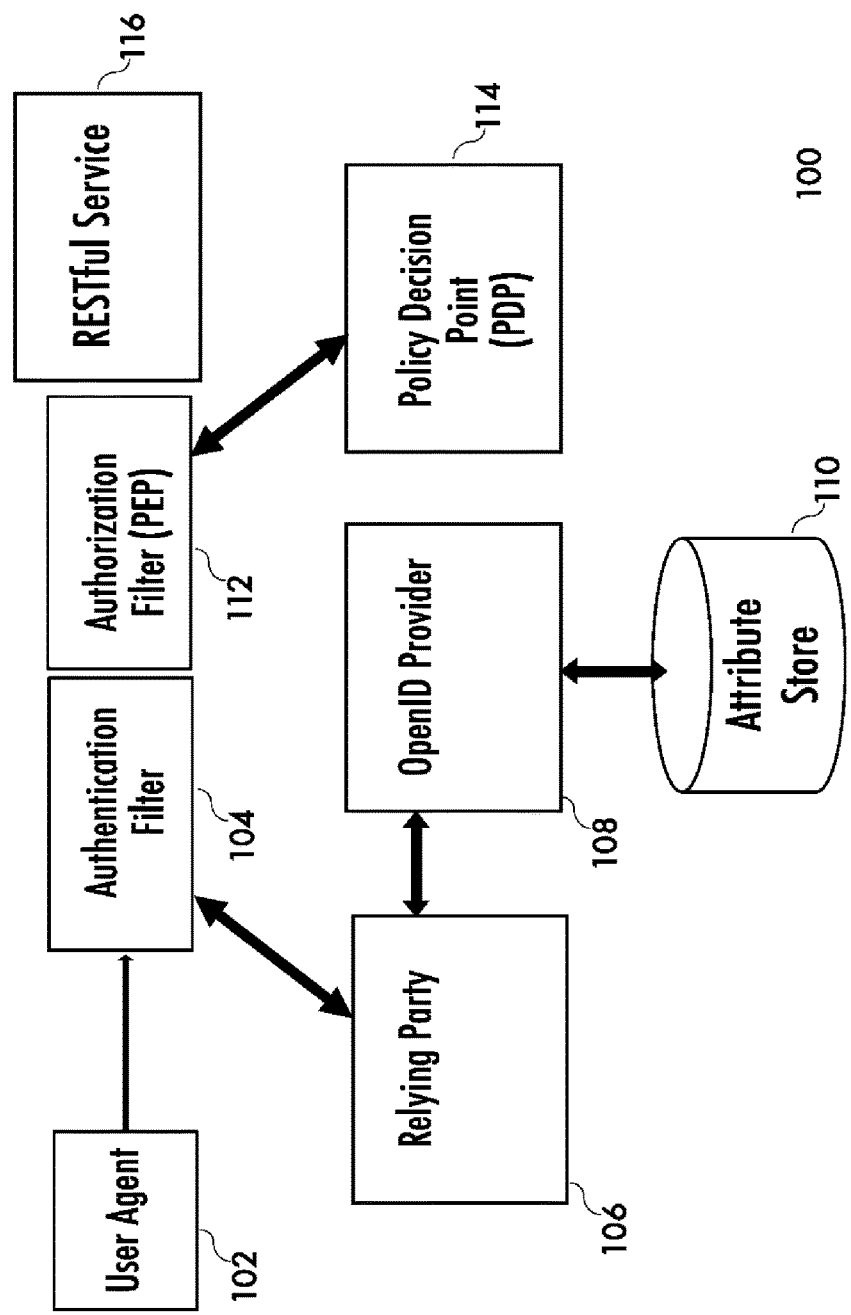
FIG. 1 shows an example high-level overview of some major components.

A RESTful service can be configured to optionally invoke an authentication filter that intercepts the request, as shown the example in FIG. 1. There are many ways to accomplish this step but the result is the redirection of requester agent, for example a client or a browser 102, by authentication filter 104 at the RESTful service. HTTP redirection from authentication filter 104 allows the user's browser, or similar mechanism, to interact directly with component 106 operable to receive the user's selection of their identity provider. Component 106 could, for example, be implemented using CAS.

FIG. 1 is an example of the sequence of the high level components. It should be understood that redirection causes the user agent, for example a browser using the HTTP protocol, to interact directly with components in FIG. 1. Redirection permits acceptance of user input, for example the selection of a identity provider, or the presentation authentication credentials.

After receiving the choice of OpenID Provider, Relying Party 106 redirects the user agent 102 to the selected OpenID Provider 108. Component 108 could, for example, be implemented using CAS. This second redirection permits acceptance of user input, for example user input used to authenticate the user to the OpenID Provider component 108 and retrieval of attributes related to the authentication process. Attributes may be retrieved from an attribute store 110.

The successful authentication of the user to the OpenID Provider component 108 and retrieval of attributes affects the decision made by the authentication filter 104 to permit or deny access to the RESTful service 116.

A RESTful service can be further configured to optionally invoke an authorization filter 112 that intercepts the authenticated request, as shown in the example in FIG. 1. There are many ways to accomplish the authorization step but the step can be referred to as an enforcement point. An enforcement point, which can be a Policy Enforcement Point (PEP), may further rely on a Policy Decision Point (PDP) 114. A decision that the authenticated user is authorized by the PDP infrastructure will permit the user to access the RESTful service 116.

Figure 2:
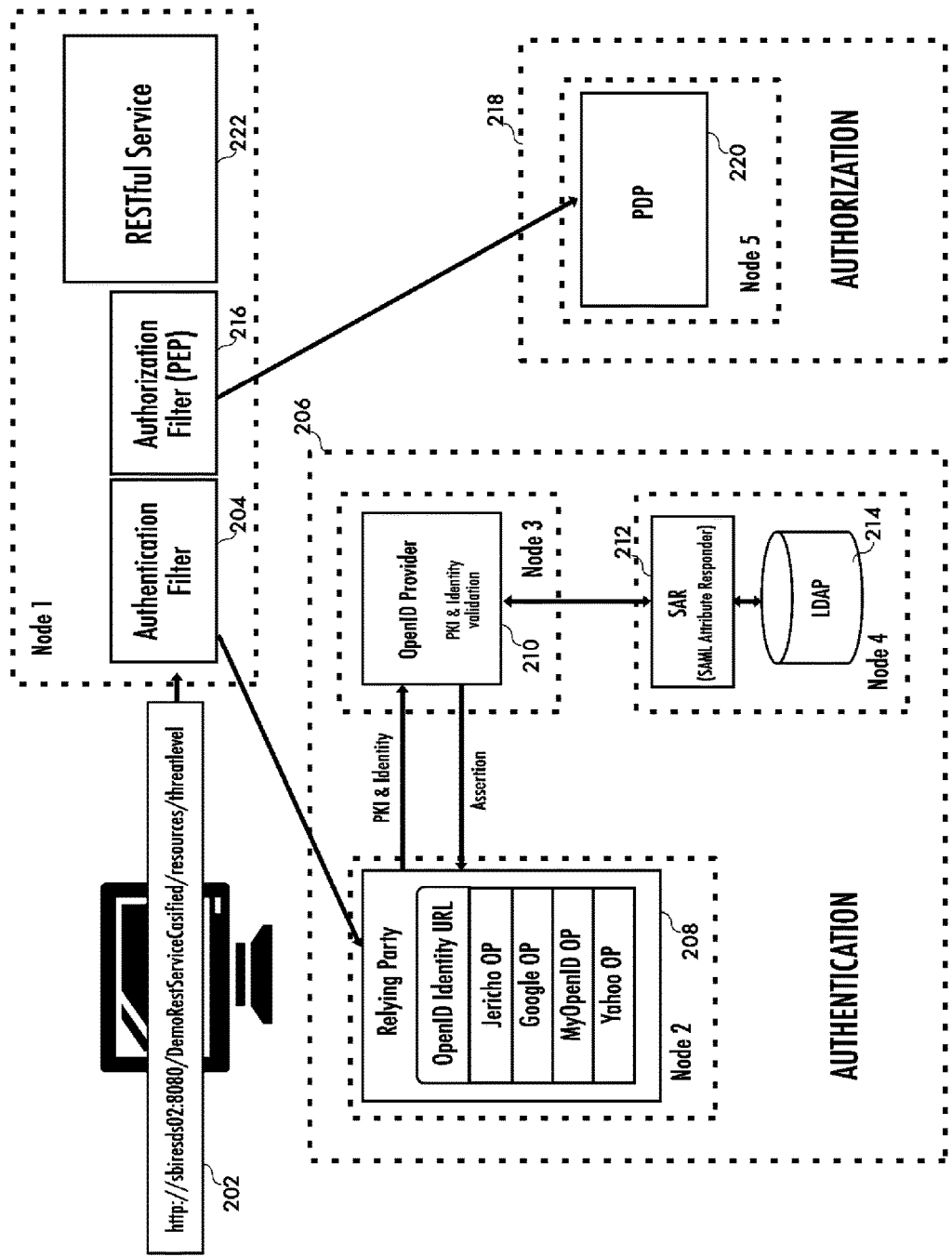
FIG. 2 shows an example high-level architectural view of the authentication and authorization functions done prior to accessing the RESTful service.

FIG. 2 is an example of a request to RESTful service 202 using, for example, the HTTP or HTTPS protocol. Authorization filter 204 triggers redirection of the request to a collection of components 206 which may, or may not, be on the same computer system, server, or node. Redirection to Relying Party 208 permits acceptance of user input, for example the selection of the user's OpenID provider from a list of available OpenID providers.

Relying Party 208, can be implemented to support the OpenID profile using CAS but custom code or other implementations or profiles are acceptable if they provide a back-channel process for validation of authentication tokens, as described below. The user selects an OpenID Provider 210 or equivalent authorization provider. An example of an OpenID Provider 210, using the OpenID architectural style, is shown in FIG. 2. Other architectural styles and implementations are possible. The selected authorization provider accepts input that can be used to validate that the user is who he or she claims to be. Authenticating entities can also be non-human, for example software applications such as Internet robots or spiders.

Proof of user identity can be based, for example, on knowledge of a password, passphrase, one-time password, cryptographic device, or shared secret. Other examples include stronger credentials such as tokens, smart cards, or devices that provide greater assurance of an identity, for example through possession of a device (tablet, personal digital assistant, cell phone, net book, smartphone, laptop, or other mobile device).

Devices can be augmented to provide strong authentication or multifactor authentication, such as the addition of a smart card or fingerprint reader to mobile devices. Examples include cases that add card readers and or fingerprint readers to cell phones (RIM BlackBerry Smart Card Reader PRD-09695-001), tablets (S.I.C. Biometrics iFMID 500xs), and laptops (Dell Latitude D430 laptop with Integrated Smart Card Reader and UPEK finger print reader). Alternately, smart card readers and fingerprint readers can be external to a device, such as attached through use of a USB port, such as S.I.C. Biometrics iFMID 300/370, Stanley Global Model SGT111. Smart card reader and fingerprint reader functionality can be added through other means, such as Bluetooth, examples include baiMobile 3000 MP or TopLink Pacific SmartBlue.

Greater trust can be placed in credentials that have been cryptographically signed by a trusted entity. Such signatures may use a manifest created from a hash of the contents of a credential which is then encrypted using an asymmetric key thus demonstrating possession of a key held by the trusted entity asserting the identity of the bearer. Other mechanisms of proof are possible, such as the demonstration that the signer is in possession of a shared secret.

Assertion Markup Language (SAML) to bind the data returned with information asserting both the sender's identity and the integrity of the returned message. One example of such a component could be a SAML attribute responder (SAR) 212. Other implementations are possible, for example use of a secure channel to a relational database, object database, XML database, or LDAP. RESTful service 222 and associated filters 204, 216, Relying Party 208, OpenID provider 210, SAR 212, and LDAP 214 may, or may not, be on the same computer system, server, or node. One example deployment is shown in FIG. 2 through the use of dashed lines and numbers denoting separate nodes 1-5, but other deployments are possible. The result of user authentication to the OpenID Provider component 210, along with any

TABLE 1

Authentication using User Smart Card 2012-03-16 13:40:59,823 DEBUG
[org.jasig.cas.adaptors.x509.web.flow.X509CertificateCredentialsNonInteractiveAction]
(http-8443-1) Certificate found in request.
2012-03-16 13:40:59,845 DEBUG
[org.jasig.cas.adaptors.x509.authentication.handler.support.X509CredentialsAuthentication
Handler] (http-8443-1) Evaluating CN = MANN.AIRE.AF.2001392207, OU = USAF, OU = PKI,
OU = DoD, O = U.S. Government, C = US, SerialNumber = 251826
2012-03-16 13:40:59,846 DEBUG
[org.jasig.cas.adaptors.x509.authentication.handler.support.X509CredentialsAuthentication
Handler] (http-8443-1) Found valid client certificate
2012-03-16 13:40:59,846 INFO
[org.jasig.cas.adaptors.x509.authentication.handler.support.X509CredentialsAuthentication
Handler] (http-8443-1) Successfully authenticated CN = MANN.AIRE.AF.2001392207,
OU = USAF, OU = PKI, OU = DoD, O = U.S. Government, C = US, SerialNumber = 251826
2012-03-16 13:40:59,846 INFO [org.jasig.cas.authentication.AuthenticationManagerImpl]
(http-8443-1) AuthenticationHandler:
org.jasig.cas.adaptors.x509.authentication.handler.support.X509CredentialsAuthentication
Handler successfully authenticated the user which provided the following credentials:
CN = MANN.AIRE.AF.2001392207, OU = USAF, OU = PKI, OU = DoD, O = U.S. Government,
C = US, SerialNumber = 251826

FIG. 2 is an example of the use of a public key infrastructure (PKI) credential, which is retrieved, for example, through interaction with the user made possible by redirection of the user's browser to OpenID Provider 210. One possible implementation is the use of a card reader accessible from the user that is operable to pass data from a card reader in a response to a request for credentials. Credentials from the smart card reader can be validated, for example using PKI validation and CRL checking. Additional methods for validating certificates could be used, such as the Online Certificate Status Protocol (OCSP). An example of authentication using a smart card credential is shown in Table 1.

Examples of smart cards that can encode digital certificates used for authentication include the U.S. Department of Defense (DoD) Common Access Card (CAC) or Personal Identity Verification (PIV) card. Examples of card readers include contact card readers and contactless card readers. Other authentication mechanisms are possible, such as voice recognition, fingerprint recognition, palm recognition, or other biometric mechanisms. Additional mechanisms may be incorporated, such as use of knowledge-based authentication, digital fingerprints, learning algorithms, anomaly detection, and behavior analysis.

Receipt of authentication information, which may be two-factor authentication information, enables OpenID Provider 210 to search and collect additional attributes known about the authenticating entity. Additional attributes may be stored in any data store, including LDAP 214 or equivalent, for example a database management system (DBMS). Retrieval of additional attributes may use the Security collected additional attributes, is provided to the authentication filter 204 associated with the RESTful service. Authentication associated information may be passed between components using the user's browser, for example using a cookie associated with the user's browser, or added to or associated with a redirection URL. The identity provider credential, for example the OpenID credential, can also be passed in the redirection of the browser to the RESTful service. Redirection of the user's agent back to the authentication filter 204 associated with the RESTful service allows the retrieval of the authentication associated information from a secure cookie, appended information in the URL string, or other mechanisms. For example, in addition to, or in place of, one or more cookies, authentication information can be associated with the user or user agent using plugins, proxy cache information, or one or more local shared objects (LSOs).

Authentication of the user may be followed with authorization filter 216. Authorization filter 216 can comprise a PEP that communicates to a networked authorization infrastructure 218 that includes a PDP 220. An alternative example would combine the PDP with the PEP. The authorization infrastructure is useful to determine if the authenticated requester should be allowed access based on the identity of the requester or attributes known about the requester. Attributes passed in RESTful request 202 may be used in authorization, for example IP address, geographic location information, or agent-specific information. Agent-specific information available can include agent or browser type, agent or browser version, language, and encoding, among others, passed in the request, which could be an HTTP request. Attributes describing the user collected during authentication as well as attributes passed with the request and known at the RESTful service can be used during authorization.

Attributes available from the authentication infrastructure 206 can be made available during exchange of information between components of the RESTful service 222 (such as authentication filter 204 and authorization filter 216) and Relying Party 208 or associated authentication infrastructure 206. This exchange of information can be done, for example, during validation of the authentication information, such as validation of service tickets or similar tokens. This "back-channel" exchange of data is a different communication exchange from the request to the RESTful service, i.e. the front-channel exchange 202. Additional attributes, such as attributes concerning the environment, type of request, requested object, or information known by the RESTful service may also be used by the authorization mechanism.

Authentication of the user to the RESTful service 222 can be accomplished through the use of a software token associated with a communication exchange. Authentication tokens that can be passed through a back channel, for example using a SAML token, JSON Web Token (JWT) or some other token. Tokens permit the use of digital signatures that can be used to identify the source of the token. Tokens also allow the use of XML Signature and XML Encryption for message-level security. SAML tokens comprise the definition found in the OASIS WS-Security SAML Token Profile standard (February 2006). Secure JSON web tokens may be substituted. Secure JSON web tokens may use: JSON Web Signature (JWS), JSON Web Encryption (JWE), JSON Web Algorithms (JWA), JSON Web Key (JWK), and Simple Web Discovery (SWD). SAML assertions comprise the definitions found in the OASIS Security Assertion Markup Language (SAML) v2.0 (March 2005). SAML assertions can be protected, encoded, encrypted, and verified using other techniques suitable to serve in secure exchanges described herein.

Figure 3:
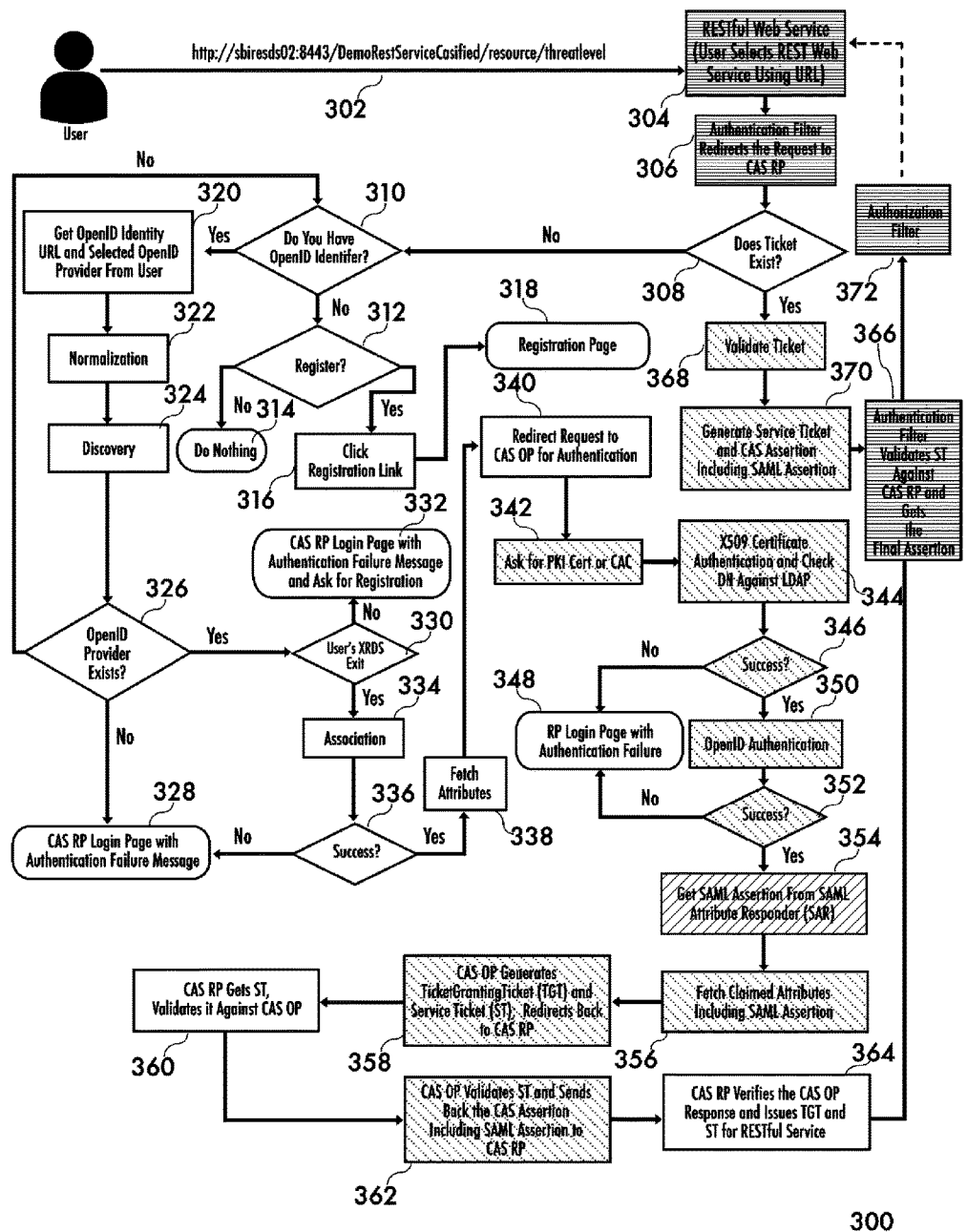
FIG. 3 shows an example detailed description of authentication of the user making a request for a RESTful service.

An assertion, SAML token, SAML assertion, or some other token, for example from SAR 212, or some other data source, can be passed directly, or wrapped in another token, to the RESTful service, with embedded information demonstrating the provenance of the token and additional attributes. Requests to a RESTful service can reuse tokens or assertions in the authentication decision-making process if consistent with the security policy of the RESTful service, authorization components 206, or attribute source. For example use of the token may require that the RESTful service trusts the issuer of the token, the expiration time of the token has not elapsed, and the token has not been tampered with, etc. Tokens can be created once the user has been authenticated, for example to OpenID Provider 210, and included or associated with future request in order to accelerate subsequent authentication of the user to the RESTful service. The validation of the token may require the exchange of information from the RESTful service to the issuer, or its agent, of the token (i.e. over a back channel). Tokens used for authentication can be found in various authentication profiles, for example OpenID, SAML, OAuth, and Kerberos. An additional example is illustrated in FIG. 3 using the OpenID authentication profile. The use of the CAS as an implementation option supports the creation of tokens called Ticket Granting Tickets (TGT) and Service Tickets (ST). Validation of STs can support the exchange of additional back-channel information added to augment attribute information that can be used by an authorization filter. An example of the authentication process is diagrammed in FIG. 3. Not all of the steps described are required and some may be unnecessary in certain deployments such as machine-to-machine access to a RESTful service. The user makes a request at 302 to the RESTful service 304, whose components are represented in the diagram using graphical elements with horizontal background lines (304, 306, 372, 366). The authentication filter receives the request 306 and optionally processes the request. The user's agent, for example a browser, is redirected to the Replying Party, whose functions are represented in the diagram using graphical elements with a solid white background (308-340, 348, 360, 364). Replying Party determines if a TGT, or ticket granting cookie, issued by the Replying Party is identifiable in the user agent's cache 308. If no ticket is identified, the user can authenticate and is asked for an OpenID identifier 310. The user may choose from a list of OpenID providers 320 or given the opportunity to register for an OpenID provider 312-318. If the OpenID identity is retrieved 320, preparations required in the OpenID profile are performed in 322, and 324. If the OpenID provider does not exist at 326, a retry at 310 or failure message at 328 occurs. If the OpenID provider does exist at 326, a file at 334 is used to connect or if no file exists user input is requested at 332. If successful at 336, a fetch attribute request is formulated at 338 and the user's agent, for example a browser, is redirected at 340 to the OpenID provider of choice 342 whose components are represented in the diagram using graphical elements with slanted background lines (342, 344, 346, 350, 352, 356, 358, 362, 368, and 370). The OpenID provider challenges the user that can include requiring multifactor authentication such as a smart card 342, for example a CAC (NIST IR 6887) or PIV (FIPS PUB 201-1). The proffered credentials are validated at 344 and, if valid, OpenID authentication continues 350, 352. Any failures result in an error message 348 to the user through the Relying Party. Information in the user's credentials or information known to the OpenID provider can be used to search and identify additional attributes. Attributes may be returned from a data store, for example SAR 354, represented by the graphic element with reverse slanted lines (354). Attributes are retrieved at 356 and TGT (if needed) and ST are generated at 358. A string identifying the TGT can be stored in a tightly scoped cookie (which could be called the ticket granting cookie) in the user agent's cache by the OpenID Provider. The ST or a reference to the ST may be appended to the redirect URL or stored in the user cache for use by the Relying Party. The Relying Party component validates the ST at 360 and receives additional attributes that can use a protected SAML assertion or SAML token 362 from the OpenID Provider. The Relying Party relying upon the authentication by the OpenID Provider, issues a ST specific to the user request for access to the RESTful service 364. The Relying Party creates a TGT to accelerate identification of the user in future requests by the requester. The user's agent is redirected to the RESTful service and uses the ST to authenticate. During the validation of the ST 366 that can be over a secure communications channel such as the Secure Sockets Layer (SSL) or Transport Layer Security (TLS) protocols, the RESTful service receives the additional attributes that can be in a secure token such as a protected SAML assertion or SAML token. More specifically, secure exchange of attributes can use SSL 3.0 or TLS 1.0 for transport-level security and XML Signature and XML Encryption for message-level security. Additional ways of representing content secured with digital signatures or message authentication codes include: JSON Web Signature (JWS), JSON Web Encryption (JWE), JSON Web Algorithms (JWA), JSON Web Key (JWK), and Simple Web Discovery (SWD).

If information in the cache of the user's agent, for example a browser cache, allows identification of a TGT by the Relying Party the TGT can be immediately validated 368. Identification of a valid TGT allows the Relying Party to rely on the previous authentication by the OpenID Provider, which can be further restricted based on configuration and the elapsed time. The Relying Party can issue an ST specific to the instant request 370 and will return additional attributes that can be in a secure token, to the RESTful service 372 during the ST validation step 366.

An example of the process flow discussed above is shown in FIG. 4. Each column represents the actions performed by the actors introduced in FIG. 1. The user 402 through their agent 404, for example a browser or similar computer program, makes a request at 408 to a RESTful service 406. Redirection at 410 is made to Relying Party 412, which optionally receives the choice of OpenID provider 414 from the user 402 and executes preparations in 416, 418, 420, and 422 as needed to communicate with the selected OpenID Provider at 424 then redirects user agent 404 to OpenID Provider 426.

Figure 4:
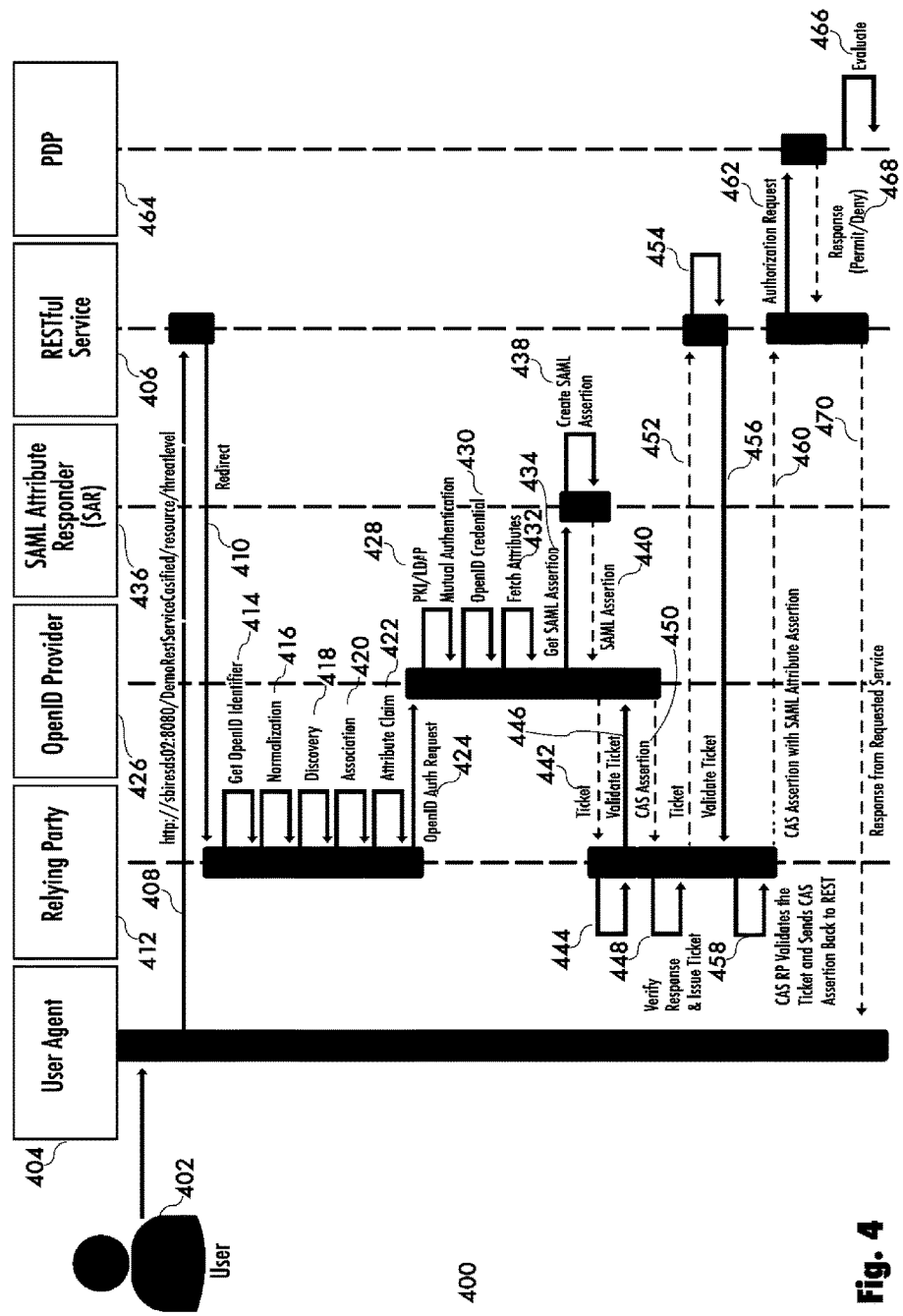
FIG. 4 shows a diagram illustrating an example of the actions performed during authentication and authorization.

The authentication profile used as an example in FIG. 4 can be implemented using the CAS architecture. Any similar authentication profile with an implementation architecture that requires the validation of the authentication object would be suitable. In CAS, for example, the TGT can be identified using information in a secure cookie in the agent cache containing a string identifying the ticket-granting ticket. The TGT issuer can use the string to identify the TGT in its database to determine if authentication is required. If the user agent possesses a valid TGT the issuer will issue an ST for use by the user agent for a specific service without additional authentication. An ST is an opaque string recommended to be 256 characters in length that may be passed in the redirect URL to the RESTful service. The issuer receives the ST from the RESTful service and checks its internal database to determine validity. Although the OpenID authentication profile is used in the figure, other authorization profiles and implementation architectures may be substituted as long as the validation of the token used in authentication to the service is validated through communication with the issuer.

OpenID Provider 426 accepts authentication credentials 428, which can be multi-factor, and can include X.509 attributes stored on, for example, a smart card. An example of data exchanged between user 402 through their agent 404, and OpenID Provider 426 is shown in Table 2.

Table 2, however other types and representations of authentication credentials are permissible. The credentials are checked at 430 and requested attributes are identified 432, using, for example, the Attribute Exchange (AE) OpenID 2.0 protocol. Attributes may be retrieved from various data sources, for example request at 434 to SAR 436, which may return requested attributes, for example by creating or passing a protected SAML assertion or a SAML token 438 returned at 440. At this point OpenID Provider 426 prepares an ST in response to request 424. If using a CAS implementation of the authorization infrastructure, a TGT may also be generated to accelerate future communication with Relying Party 412. Other mechanisms may be substituted as long as Relying Party 412 can receive attributes that can be in a secure token.

At 442 OpenID Provider sends the ST to Relying Party 412 in response to request 424 a SAML assertion, SAML token, attribute information, or other information may be included in this exchange. The identity provider credential, for example the OpenID credential, can also be passed from 426 to 412, making the credential available to the Relying Party. Processing by the Relying Party at 444 triggers the ST validation request 446 that can be over a secure channel such as SSL or TLS. The secure channel used in the instant specification supports a SOAP exchange using one or more SAML assertions over TLS but other tokens and secured channels are possible. The validation request response at 450 also allows the additional attributes retrieved by the OpenID Provider 426, possibly from multiple data sources, to be sent. Optionally, the identity provider credential, for example the OpenID credential, can also be passed in the response to the validation request, optimally in the SAML token. Additional attributes could be, for example, attributes describing the user based on PKI X.509 attributes retrieved from the smart card inserted into the card reader described above. Attributes may have been passed from SAR 436, for example over SOAP using a SAML assertion passed at 440. Additional attributes may be gathered and included, for example attributes specifically requested using the Attribute Exchange (AE) OpenID 2.0 protocol. Attributes can be retrieved from multiple data sources, for example DBMS,

TABLE 2

Data Received from Smart Card During Authentication 2012-03-16 13:40:59,823 DEBUG
[org.jasig.cas.adaptors.x509.web.flow.X509CertificateCredentialsNonInteractiveAction]
(http-8443-1) Certificate found in request.
2012-03-16 13:40:59,845 DEBUG
[org.jasig.cas.adaptors.x509.authentication.handler.support.X509CredentialsAuthentication Handler]
(http-8443-1) Evaluating CN = MANN.AIRE.AF.2001392207, OU = USAF, OU = PKI,
OU = DoD, O = U.S. Government, C = US, SerialNumber = 251826
2012-03-16 13:40:59,846 DEBUG
[org.jasig.cas.adaptors.x509.authentication.handler.support.X509CredentialsAuthentication Handler]
(http-8443-1) Found valid client certificate
2012-03-16 13:40:59,846 INFO
[org.jasig.cas.adaptors.x509.authentication.handler.support.X509CredentialsAuthentication Handler]
(http-8443-1) Successfully authenticated CN = MANN.AIRE.AF.2001392207,
OU = USAF, OU = PKI, OU = DoD, O = U.S. Government, C = US, SerialNumber = 251826
2012-03-16 13:40:59,846 INFO [org.jasig.cas.authentication.AuthenticationManagerImpl]
(http-8443-1) AuthenticationHandler:
org.jasig.cas.adaptors.x509.authentication.handler.support.X509Credentials- AuthenticationHandler
successfully authenticated the user which provided the following credentials:
CN = MANN.AIRE.AF.2001392207, OU = USAF, OU = PKI, OU = DoD, O = U.S. Government,
C = US, SerialNumber = 251826

OpenID Provider 426 receives credentials providing X.509 attributes, which may be similar to the information in databases, database gateways, hardware devices, sensors, computational units, and combinations thereof.

Examples of PKI X.509 attributes include the subject's name, subject's public key, subject's e-mail address, and issuer of the attributes. Subjects can be persons, applications, or systems. Attributes may identify privileges the subject may have to execute operations on a system, such as create, read, update and delete operations. As a result of the communication between the relying party and OpenID provider, a token, which may be a SAML token, JWT, or some other means for protecting an assertion containing additional attributes, can be kept at Relying Party 412 for subsequent authentication requests by user 402 for this or other services, which could include RESTful services. Relying Party 412 can also cache the identity provider credential, for example the OpenID credential, if passed OpenID Provider 426. The amount of time the assertion or credential can be relied upon can be specific to the implementation and configuration of Relying Party 412 and OpenID Provider 426. Attributes that change frequently may require a SAML assertion that carries within it a shorter expiration date or time.

In the example implementation shown in FIG. 4, Relying Party 412 creates a ST specific to the initial user request at 448 for the RESTful service 406. Redirection of the user from Relying Party 412 back to the RESTful service 406 at 452 allows the authentication filter, or similar RESTful service component, to read ST at 454. Optionally, the identity provider credential, for example the OpenID credential, can also be passed in the redirection of the browser to the RESTful service at 452. The authentication filter then requests validation of the ticket at 456 from Relying Party 412 which validates at 458 and returns validation information encapsulated, for example in a protected SAML assertion, SAML token, or some other assertion. Additional attributes that may be useful to the RESTful service are passed in validation exchange 460. The identity provider credential, for example the OpenID credential, can be passed in this exchange. These additional attributes can be sent at 462 to an authorization component 464 to determine access of the now authenticated user in the authorization at 466. In response to the authorization request, access is permitted or denied at 468, which determines the content sent to the user at 470.

Figure 5:
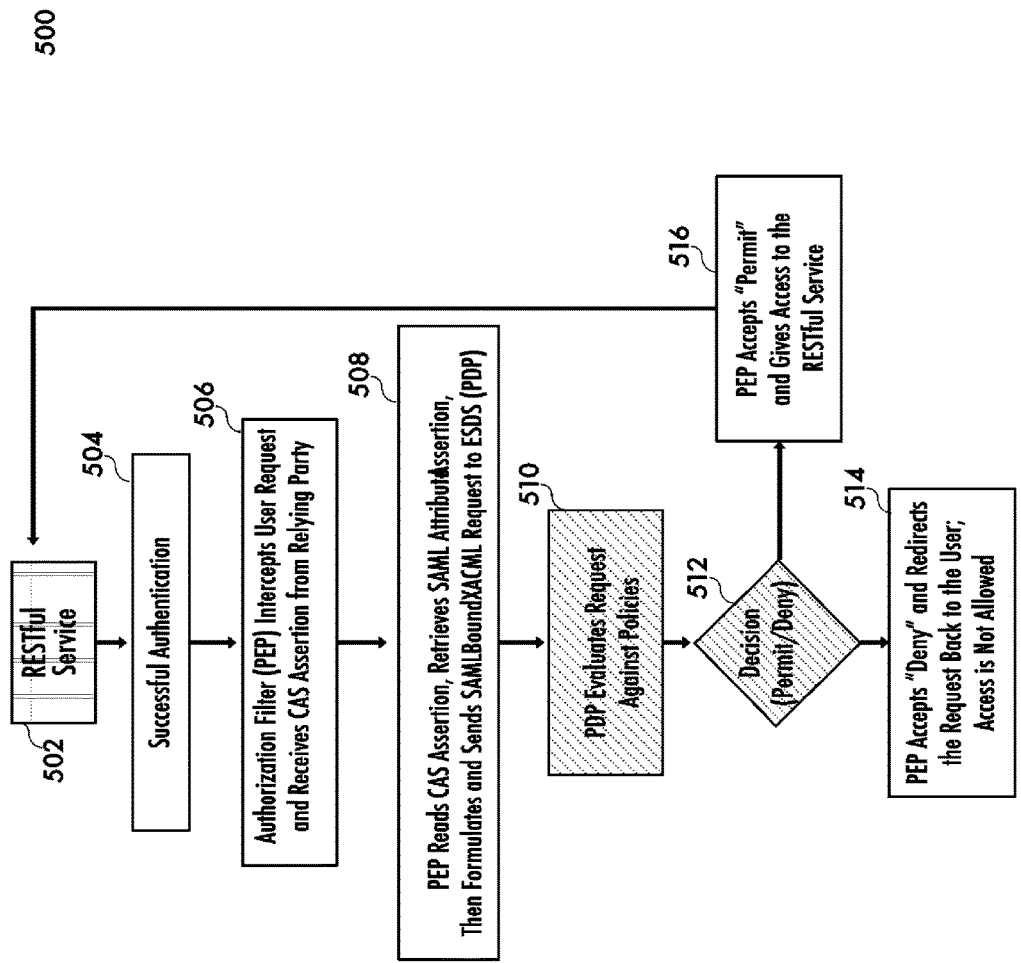
FIG. 5 shows a detailed description of an example authorization to a RESTful service.

FIG. 5 provides an example of a high-level view of the application of authentication 504 and authorization 506 filters. RESTful service 502 uses the authentication filter to authenticate the requester at 504. The PEP, typically embedded at a "choke point" 506 in RESTful service 502, formulates at 508 a call to PDP 510, represented in the diagram using graphical elements with slanted background lines (510, 512). The PDP may have access to additional attributes from the authorization procedure. For example, the PDP may have access to other attributes passed in the RESTful services call, known by the RESTful service, or available from data sources, for example databases, SARs or attribute information points. PDP 510 provides a robust authorization decision capability that can be executing on the same or different computer system, server, or node. Communications between the PEP to the PDP is optionally done using secure mechanisms, for example TLS or SSL communications channel and/or SAML tokens over HTTP SOAP.

The PDP evaluates the request from the PEP at 510, for example using XML-based techniques such as a rules engine. Examples of rules engines include XACML, Drools, and EnterSpace® Decisioning Service (ESDS) (Jericho Systems Corporation). After evaluation, PDP 510 issues an authorization decision at 512 that can be based in part on the additional attributes passed to the RESTful Service during the validation of the ST used to authenticate the user to the RESTful service. The user can be denied 514 or allowed 516 access to the RESTful service 502. A PDP may respond to multiple PEPs, or it may respond to a single PEP, or it may use a fail-over to another PDP, or it may be embedded with a PEP, or other architectural relationships or combinations thereof. The PDP infrastructure can be centrally managed. Access control rules or policies may be pushed to PDPs or pulled by PDPs. Use of rules or policies allows advanced authorization techniques such as Role based Access Control (RBAC), Attribute Based Access Control (ABAC), Risk-Adaptable Access Control (RAdAC), and other approaches. Rules or policies may be stored at a Policy Administration Point (PAP).

The system, coupled with retrieved additional attributes allows fine grain control, for example, to access data, resources, or operations that are sensitive, that could put health and safety in jeopardy, or that could result in financial liability. Examples related to special sensitivity include military data, trade secret data, business records, medical data, operations on databases, to name a few. Examples related to health and safety include health records, access to electronic medical equipment, police equipment, fire equipment, operations on military databases, to name a few. Examples related to financial liability include financial records, stock trading records, access to electronic financial computer resources, government records, to name a few. Authorization as described herein could be used for access to physical spaces, such as a request to open a door from a browser or other application on a mobile device involving a RESTful web service and many other related scenarios. An example of interactions between the system described and the user are shown in FIGS. 6A-6D. As shown in the FIG. 6A example, requests to the RESTful service may be made using a web browser 602 by entering the URL of the desired RESTful service 604. Although the Mozilla Firefox® browser is shown, any browser can be used. A partial list of common browsers includes: Internet Explorer® (Microsoft Corporation), Chrome® (Google Corporation), Safari® (Apple Inc.), Opera® (Opera Software ASA), and Netscape Navigator® (AOL Corporation). RESTful interfaces can also be accessed directly by an application without the need for a browser. Examples of applications that may interact with RESTful services include electronic health record applications, financial trading applications, remote voting applications, and military tactical applications. These and similar applications could be stationary or mobile, for example hosted on eReaders, tablets, personal digital assistants, cell phones, net books, smartphones, laptops, and other devices. URL 604 specifies secure communication over the HTTPS protocol but the unsecured HTTP protocol can be used as shown 408 in FIG. 4. Alternative protocols to HTTP can be used, such as SPDY or Stream Control Transmission Protocol (SCTP).

As shown in the FIG. 6B example, GUI 608 shows an example of how OpenID providers can be selected from a list using a drop-down menu 610. A partial list of alternatives to a drop-down menu include: radio buttons, check boxes, scrollable lists, auto-completing/auto-suggesting text field, multi-layered tree, or allowing the user to type in the OpenID provider.

Authentication of the user by the OpenID provider results in attributes being returned to the Replying Party that may be sent to a RESTful service for uses such as authorization. Approaches to the number and type of attributes include returning all attributes, limiting attributes by configuration, limiting attributes by security clearance of the receiver, or allowing the user to select the attributes returned, for example. As shown in the FIG. 6C example, GUI 614 shows how users can specify attributes, such as employee number 616 from an interface. Retrieval of specific attributes can be supported by the use of the Attribute Exchange (AE) protocol in OpenID 2.0. Table 3 shows an example of data specifying attributes exchanged between the Replying Party and the OpenID Provider. Replying Party example in Table 3, was implemented using CAS, other implementations are equally suitable. Table 3 demonstrates the Attribute Exchange (AE) protocol in OpenID 2.0, which permits attributes to be specified as "required" or "optional." Required attributes shown in Table 3 include: e-mail address, serial number, initials, and common name. Optional attributes shown in Table 3 include: middle name, given name, employee number, and favorite color.

TABLE 3

Data Specifying Attributes for Retrieval 2012-03-16 13:40:43,793 INFO
[com.jericho.es.openid.web.servicesJerichoOpenIdConsumerService] (http-8443-1)
https://sbiresds01:8443/cas/openid?service=https%3A%2F%2Fsbiresds02%3A8443- %2Fc as%2Fcallop
2012-03-16 13:40:43,794 INFO
[com.jericho.es.openid.web.servicesJerichoOpenIdConsumerService] (http-8443-1)
[ OpenID Provider URL :
https://sbiresds01: 8443/cas/openid?service=https://sbiresds02:8443/cas/callop&openid.
ns=http://specs.openid.net/auth/2.0&openid.claimed_id=http://specs.openid.- net/auth/2.0/
identifier_select&openid.identity=http://192.168.220.10:8080/cas/users/MAN- N.AIRE.AF.
2001392207&openid.return_to https://sbiresds02:8443/cas/callop&openid.realm=https://
sbiresds02:8443/cas/callop&openid.mode=checkid_setup&openid.ns.sreg=http:/- /openid.n
et/sreg/1.0%openid.sreg.required=mail,sn,initials,cn&openid.sreg.optional=- middleName,
givenName,employeeNumber%openid.ns.ext2=http://openid.net/srv/ax/1.0&openi- d.ext2.
mode=fetch_request&openid.ext2.type.middleName=http://schema.openid.net/na- mePerson/
middleName&openid.ext2.type.mail=http://schema.openid.net/namePerson/mail&- openid.ext
2.type.sn=http://schema.openid.net/namePerson/sn&openid.ext2.type.initials- =http://sche
ma.openid.net/namePerson/initials&openid.ext2.type.cn=http://schema.openid- .net/nameP
erson/cn&openid.ext2.required=mail,sn,initials,cn&openid.ext2.type.givenNa- me=http://sch
ema.openid.net/namePerson/givenName&openid.ext2.type.employeeNumber=http:/-/sche
ma.openid.net/namePerson/employeeNumber&openid.ext2.type.favoriteColor=htt- p://mak
otogroup.com/schema/1.0/favoriteColor&openid.ext2.if available=middleName,givenName,
employeeNumberfavoriteColor]

The selected OpenID provider requires the user to offer proof of their identity during the authentication challenge. As shown in FIG. 6D, Instructions 620 can be displayed on the user agent because it has been redirected to the OpenID provider. Multi-factor authentication can be used, for example requiring the user insert a smart card into a card reader and entering their Personal Identification Number (PIN) 621.

Figure 7:
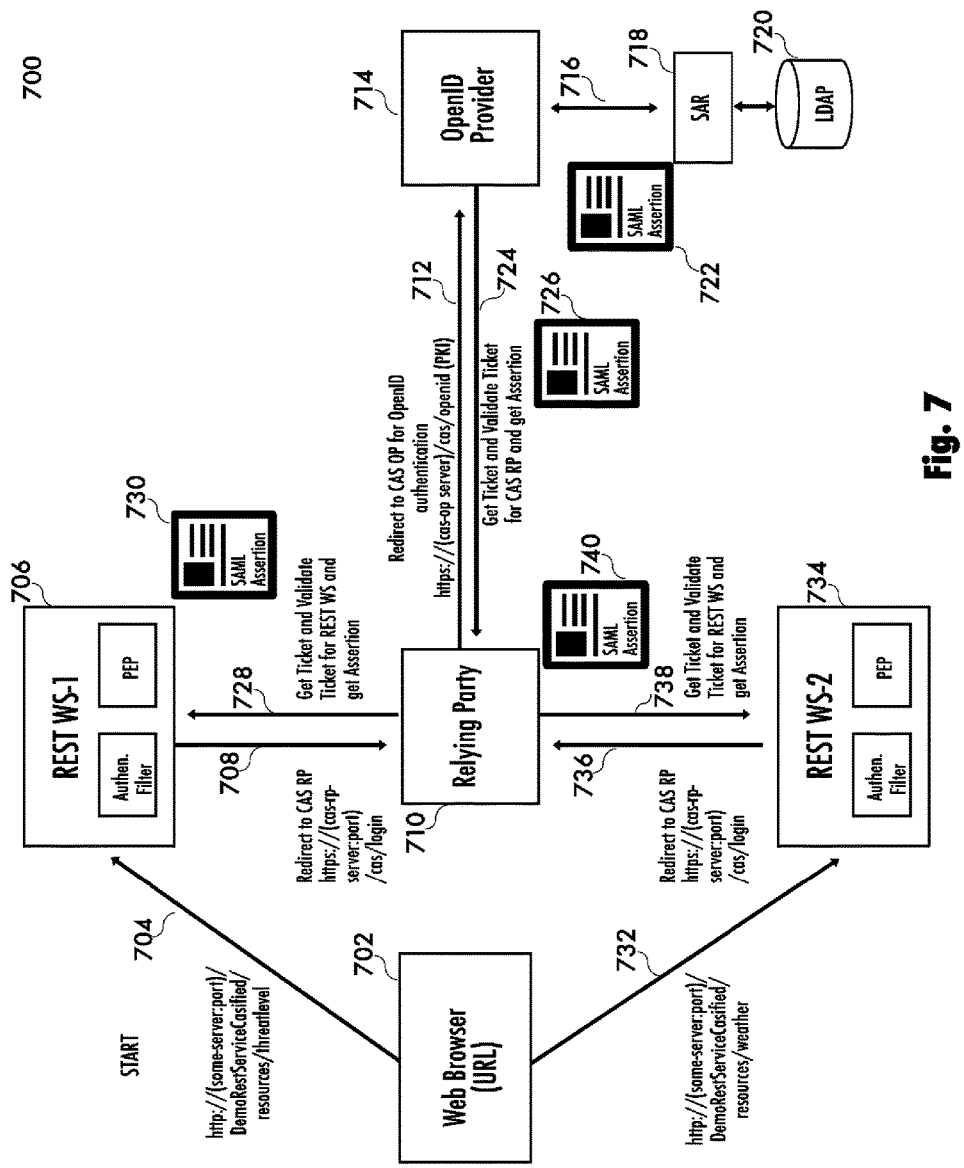
FIG. 7 shows an example of "single sign-on."

One example of the use of tokens allows Single Sign-On (SSO) capability, as shown in FIG. 7. User's agent, for example browser 702, accesses through 704 to RESTful service 706, named REST WS-1 in the figure. An authorization filter, or equivalent, at the RESTful service uses a mechanism, such as a browser redirect at 712, to direct the user's agent at 708 to Relying Party 710. Redirection allows the user to select their choice of OpenID provider that serves as the authenticating component. When authorization request is made to OpenID Provider 714 redirection of the user agent occurs at 712 allowing the challenge of the user for identifying information. The user provides authenticating information that can vary in strength from simple authentication using passwords to multifactor authentication, for example using hardware tokens or smart cards with embedded PKI certificates. Multifactor authentication can be used, especially when the higher strength credentials can be used to identify the attributes of the user in a trusted attribute store. One example of a higher strength credential is a PKI certificate issued by a trusted certificate authority.

Hardware-based or software-based components meeting Federal Information Processing Standard (FIPS) 140-2 certified cryptography modules may be used to support PKI functionality. Examples of vendor FIPS 140-2 certified cryptography modules available include BlackBerry (Research In Motion Ltd.), Astro (Motorola Solutions, Inc.), OpenSSL Cryptographic Module (Red Hat Inc.), NetScreen (Juniper Networks, Inc.), and Catalyst (Cisco Systems, Inc.).

In addition to their use in authenticating a user, PKI identifiers, such as an X.509 user identifier, can be used to locate additional attributes associated with the user. Such additional attributes may be directly addressable by the OpenID Provider 714 or retrieved at 716 from one or more data stores, such as a Relational database management system (RDBMS) or LDAP 720. Attributes can be encapsulated in a tamper-evident envelope, such as SAML assertion 722, possibly using SAR 718. OpenID Provider 714 will create and make available tokens ST and TGT sent at 724. The identity provider credential, for example the OpenID credential, can also be passed in this exchange. The TGT is used to accelerate subsequent authentication between Relying Party 710 and OpenID Provider 714. The ST issued by the OpenID Provider is used to establish authenticated communication between Relying Party 710 and OpenID Provider 714. In the OpenID example architecture, Relying Party 710 communicates with OpenID Provider 714 to validate the ST. This validation "back-channel" reply at 724 can include additional attributes concerning the user in an assertion that can be a SAML assertion 726. Other data exchange approaches between Relying Party 710 and OpenID Provider 714 can be substituted.

After successful user authentication, Relying Party 710 issues a TGT identifier to the user agent's cache 702 can be in a secure web cookie and makes an ST available specific for REST WS-1 706 authentication, for example by appending the ST to the redirection URL. The identity provider credential, for example an OpenID credential, can also be passed in this exchange. REST WS-1 706 communicates with Relying Party 710 for ST validation. This validation "back-channel" reply at 728 can include the additional attributes that can be in a protected SAML assertion or SAML token 730. The additional attributes can be used for any purpose by REST WS-1 706, but are especially useful for determining if the user is authorized to access data or functionality available through the RESTful service.

Subsequent request 732 to a suitably configured RESTful service at 734 (named REST WS-2), demonstrates SSO capability. REST WS-2 734 requests user authentication at 736 and redirects the user agent 702 to Relying Party 710 that was used previously to authenticate the user to REST WS-1 706. Relying Party 710 identifies the TGT using information in the user agent's cache left during the previous authentication. Relying Party 710 relies on the TGT it created for authentication, if it is still valid, instead of challenging the user for authentication credentials.

Relying Party 710 creates an ST (that may be passed by appending it to the URL redirection string) that will be used between agent 702 and REST WS-2 734. The identity provider credential, for example an OpenID credential, can also be sent in this exchange if it was passed by OpenID Provider 714 and cached by Relying Party 710. Upon receipt of the ST by REST WS-2 734, an ST validation request will be sent to Relying Party 710. Validation at 738 allows additional attributes to be passed in a protected SAML assertion or SAML token 740 or some other token. SAML assertion or token 740 may be identical to SAML assertion or token 730 or it may be reissued depending on several factors. Factors may include the expiration of the SAML assertion or related certificates, the dynamic or static nature of the attributes, the nature of the RESTful service, external factors such as national threat level, time of day, current weather, geographic location, or configuration settings such as level of assurance or user clearance requirements. Expiration of the assertion or other change in circumstance or external factors may trigger a RESTful service to terminate further communications until the user authenticates to the identity provider again, which could be an OpenID provider, and retrieves, through the exchange of new ST, newly retrieved additional attributes, that can be passed in a protected assertion, SAML assertion or SAML token.

REST WS-2 734 can use the additional attributes in the assertion, for example, as part of authorization decisions involving the identified user. It can be seen from the discussion that use of a TGT token from Relying Party 710 can simplify authentication to multiple RESTful services. Further, validation of the ST issued to each RESTful service for the authenticated user allows the transfer of additional attributes that can be used for the determination of authorization to functions and data through each RESTful service. This approach can be used from any device that supports a browser, or other agent or application, such as eReaders, tablets, personal digital assistants, cell phones, net books, smartphones, laptops, and other mobile devices.

One possible approach can provide an SSO solution for a secured Web site, allowing a user to login once and be able to access multiple RESTful Web services using, for example, an Asynchronous JavaScript and XML (AJAX) framework or RESTful client. In one example, the AJAX technique is used, allowing computer programs, for example web applications, to send data to, and retrieve data from, one or more servers asynchronously (in the background) without requiring constant re-authentication of the user. Ajax can use the XMLHttpRequest object, which can be implemented in ActiveX or JavaScript, XML or JSON, and presentation languages such as HTML, XHTML, and CSS. Examples of available Ajax frameworks include ASP.NET, AJAX, jQuery, MooTools, and YUI Library as representative examples.

Figure 8:
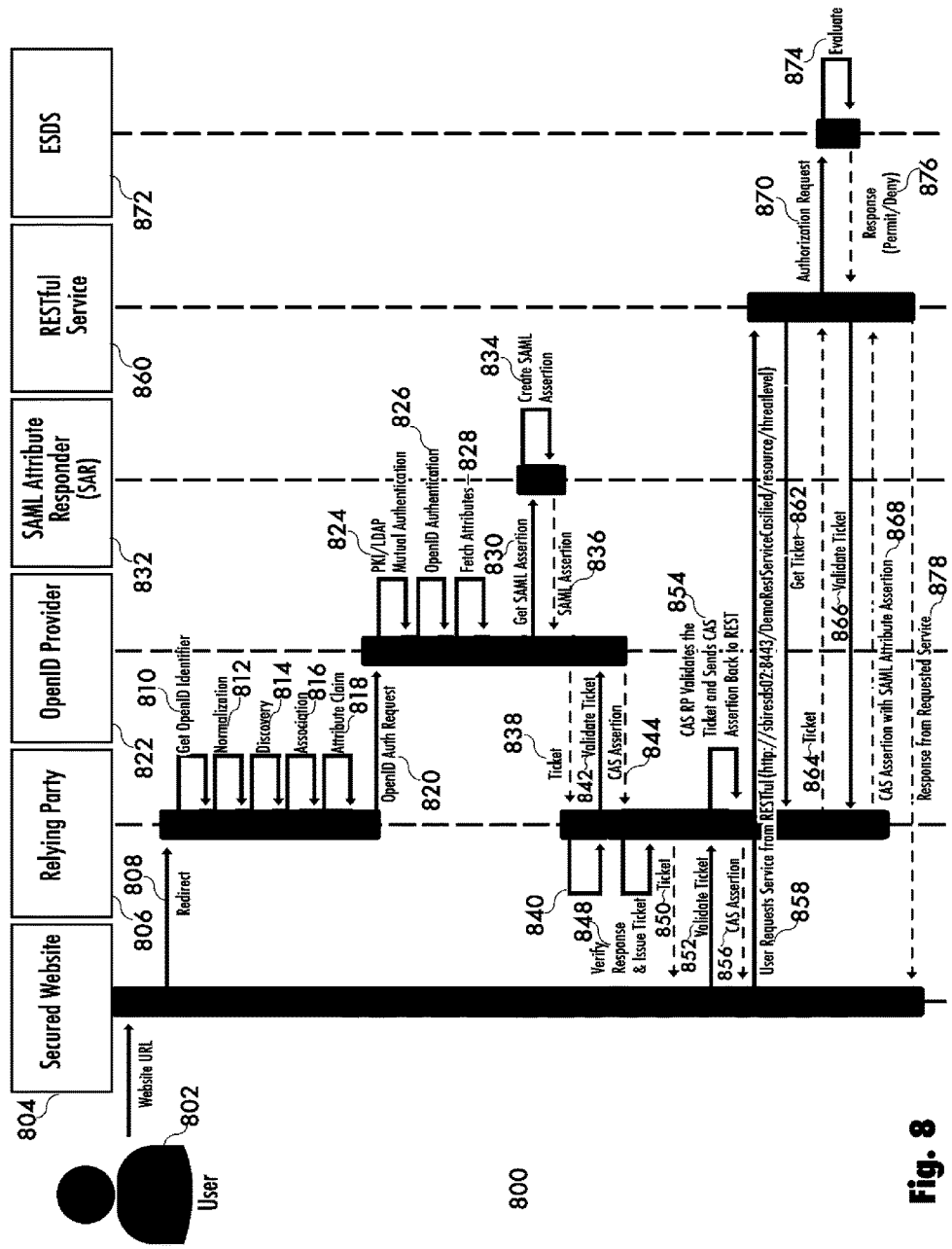
FIG. 8 shows an example diagram illustrating the actions performed in support of a "single sign-on" during authentication and authorization.

An example summarizing the discussion above is shown in FIG. 8. User 802 triggers the authentication step by accessing a secured website 804, which may use Ajax or similar technology, operable to invoke the authentication process shown in the figure. Access to the website can be through a RESTful architectural style, as was shown in FIG. 4, but any request triggering the authentication scheme is possible. For example, use of SOAP, SOAP RPC over HTTP, or non-HTTP requests to, for example, a custom API to a service connected over a network. In addition, other authentication profiles, or combinations thereof, can be used for the initial request, such as OAuth, Shibboleth, Information Card, Janrain, Forgerock, or OpenAM.

Using OpenID as the authentication protocol, FIG. 8 shows an example of access to Secured Website 804 triggering redirection of User 802 at 808 to Relying Party 806 for user authentication. Secured Website 804 may also act as a proxy, serving as the agent for the user. The OpenID Identifier (a URL or XRI) is retrieved at 810. The OpenID string is processed (normalized) at 812 to create a conformant identifier. Relying Party 806 marshals any information for initiating requests at 814, possibly using HTML-Based discovery, Yadis or XRI resolution protocols. Relying Party 806 and selected OpenID Provider 822 (optionally) exchange a shared secret at 816 for secure communications. An attribute claim is (optionally) prepared at 818, using the OpenID attribute exchange (AE) extension, to request specific attributes. The OpenID Authorization request is made at 820, either directly or through redirection. User 802 is redirected to OpenID Provider 822. User 802 submits credentials at 824 that can be based on multi-factor authentication. Examples of multi-factor authentication include, for example, may be at least two of the factors: fingerprint, knowledge based, voice, palm, physical token, hardware device, mobile device, smart card, and PIN. The user is authenticated at 826, for example by validating the credentials, for example cryptographically or by accessing data sources. Alternately, a TGT previously issued by the OpenID Provider 822 could be used to authenticate, removing the need for the user to reenter their authentication credentials. Requested or preconfigured attributes are identified at 828 and missing attributes are retrieved from data sources. For example, a request for attributes using SAML could be requested at 830, resulting in an attributes look up at 834 by SAR 832. Attributes returned from many data sources are possible and some attributes may be returned in one or more assertions, SAML assertions, or possibly in a tamper-evident SAML token at 836.

Relying Party 806 receives a TGT, if it did not have one, and a ST at 838 for use with OpenID Provider 822. The identity provider credential, for example an OpenID credential, can be sent in this exchange if cached. ST may be linked to User 802, allowing Relying Party 806 to retrieve separate STs for separate users on separate requests. Relying Party 806 optionally processes ST at 840 and requests validation of the ST at 842, allowing OpenID Provider 822 to return the additional attributes with validation message at 844. OpenID Provider 822 and Relying Party 806 can also exchange an assertion, SAML assertion, or token at 838. The identity provider credential, for example an OpenID credential, can also be sent in this exchange and cached by Relying Party 806. Additional attributes may have been from data sources accessed, for example, by SAR 832, returned in an assertion, protected SAML assertion or tamper-evident token such as SAML token 834. Upon verification at 848, Relying Party 806 issues a TGT, if one does not exist, and makes available an ST specific to the interaction at Secure Website 804 at

850. Secure Website 804 requests validation at 852 triggering validation by Relying Party 806 at 854. The validation message may include attritional attributes from Relying Party 806 at 856. Additional attributes may be identical to attributes retrieved or known by OpenID Provider 822 or attributes may be processed, augmented, replaced, removed, or added to by intermediaries, for example Relying Party 806. Additional attributes may be used by Secure Website 804 or passed to other components, sites, or environments, possibly on different computer systems, servers, or nodes that can use a tamper-evident token.

The authentication described above relies upon User 802 submitting authentication credentials at 824. Alternatively, Secure Website 804 could supply credentials that can be PKI credentials, at 824. Request for attributes at 830, would then be based on attributes known about the by Secure Website 804 instead of a user of the secure website. Consequently, authentication and authorization at RESTful Services may be based on attributes associated with Secure Website 804. The identity of the user of the site could be kept secret from calls to RESTful services or disclosed. Further, Secure Website 804 could associate an identification object to each user. RESTful Services could use the user identifier to track activity, sessions, and other information, on a Secure Website. This allows use of Secure Website 804 authentication credentials instead of user credentials, providing proxy functionality and enhancing the privacy of the user interacting with a RESTful service. Returning to authentication based on User 802 credentials, behavior of User 802 on Secured Website 804 may trigger a request to RESTful Service 860, for example triggering a call to determine the current national security threat level at 858. RESTful Service 860 redirects to Relying Party 806, which may identify User 802 based on the TGT issued previously. Relying Party 806, may then issue an ST without requiring presentation of credentials by User 802 specific to User 802 for access to the RESTful Service 860, which could be a RESTful gateway interfacing to other services. RESTful Service 860 communicates with Relying Party 806, for authentication at 826. Relying Party 806 returns ticket at 864 to authenticate User 802 on Secured Website 804. The identity provider credential, for example an OpenID credential, can also be sent in this exchange. Validation of the ST at 866 allows Relying Party 806 at 868 to send additional attributes to RESTful Service 860 that can be in an assertion, protected SAML assertion or a tamper-evident token, such as a SAML token. Other profiles and protocols could be used in place of the OpenID ticket validation to exchange information from the Relying Party 806 to RESTful Service 860. Tickets may be passed directly, or indirectly (i.e. through the use of a browser or other agent). An example of a ST issued by Relying Party 806 and used to authenticate to RESTful Service 860 is shown in Table 4.

and the ST reference "ST-1-NGdGiAdZT7xbIE2LYGPp-cas" is passed during the redirect at 858. Other implementations are possible. The authentication filter at the RESTful service is specially configured to accept and act on the ST reference.

Once authentication information and additional attributes are received, RESTful Service 860 may request authorization at 870 from a PDP or decisioning service that can be ESDS 872. The request is evaluated at 874 and a response returned at 876. RESTful Service 860 responds to request 858 at 878. In this way, the TGT issued by Relying Party 806 allows other requests triggered by the behavior of User 802 on Secured Website 804 to be serviced by other RESTful services without requiring entering the user credentials, i.e. inserting a smart card and typing a PIN. This approach described above provides additional benefit with client-side implementations, such as Ajax. The degree of security of the client or secured website can be in question based on the source of the request, examples include requests from a non-local IP network range, requests from outside a Virtual Local Area Network (VLAN), a request from a different physical location (for example, outside of a Sensitive Compartmented Information Facility (SCIF), a guarded area, or commercial building), requests from outside of a "cloud" implementation, or requests between differing security levels (for example a client-side implementation calling services requiring a specific security clearance). In these cases SSO can be established using a relying party known to be secure without requiring authentication information from the requestor, which might not have adequate security.

Cloud computing environments offer many services, for example Software as a Service (SaaS), Infrastructure as a Service (IaaS), Identity as a Service (IDaaS), Data as a Service (DaaS), Platform as a Service (PaaS), Storage as a Service (STaaS), etc. Cloud computing environments rely on economies of scale where loosely coupled architectures provide virtualization, scalability and device and location independence. Cloud computing environments have autonomous domains, virtual organizations, and inter-cloud systems serving large numbers of users in an ad-hoc bases. Access control becomes complex, since there may be no ability to identify, locate, or access attributes of the requester across the environment. The approach described above allows attributes tied to a requester through their authorization credentials will be transferred to the security domain of the RESTful service. This simplifies identification of appropriate attributes and the trust the RESTful system might have in those attributes based on the provider or issuer.

Trust in the attributes associated with the authenticated user may be elevated because the infrastructure providing the attributes can be certified for the exchange of classified or sensitive attributes. For example, the RESTful application may not be certified for exchanging classified information

TABLE 4

ST Authentication to RESTful Service 2012-03-16 10:44:50,293 INFO [org.jasig.cas.CentralAuthenticationServiceImpl](http-4843-1)
Granted service ticket [ST-1-NGdGiAdZT7xbIE2LYGPp-cas]for service [https://sbiresds02:
8443/DemoRestServiceCasified/resources/threatlevel]

The example in Table 4 shows the granting of service ticket 850 specifically for User 802 by Relying Party 806 for RESTful service 860. The SAML assertion in the example has been excised for brevity. In this example implementation, the ST, shown in Table 4, remains at the Relying Party (for example, attributes) about the user in a front channel exchange but the use of a back channel within a certified infrastructure may allow the passing of classified or sensitive information about the user. The trusted back channel allows information of a trusted nature to be used in authorization decisions, providing more confidence in the authorization process than possible from a front channel RESTful service request.

Further, RESTful Service 860 receives attributes from a trusted source, for example SAR 832, that can be identified using a high-assurance token, for example a cryptographically signed token, assertion, protected SAML assertion, or SAML token. Exchanged tokens may use, for example, SSL 3.0 or TLS 1.0 for transport-level security and XML Signature and XML Encryption for message-level security. Additional ways of representing content secured with digital signatures or message authentication codes include: JSON Web Signature (JWS), JSON Web Encryption (JWE), JSON Web Algorithms (JWA), JSON Web Key (JWK), and Simple Web Discovery (SWD).

Figure 9:
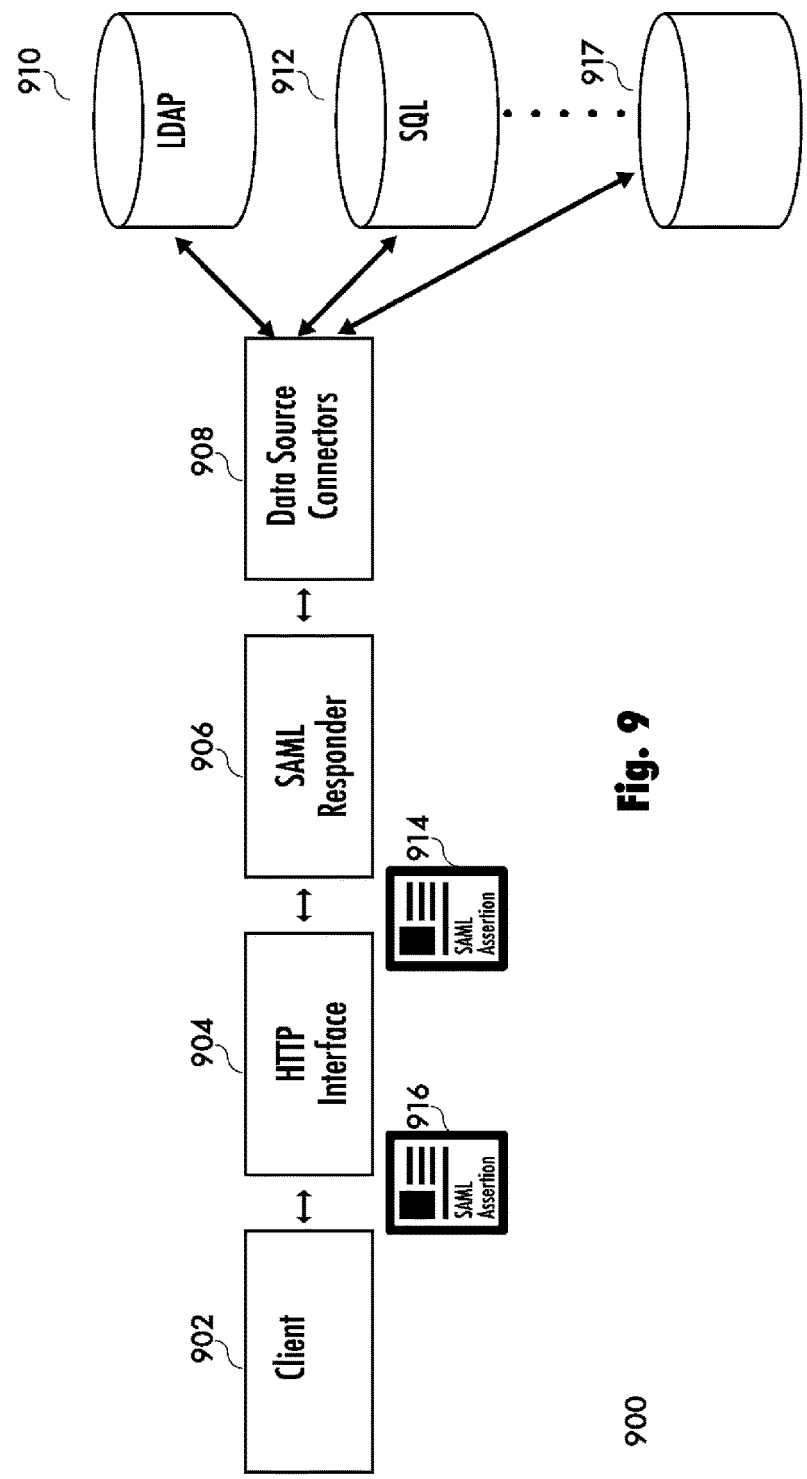
FIG. 9 shows an example high-level overview of the SAML Attribute Responder.

One example of the use of a SAR implementation is shown in FIG. 9. SAR retrieves attributes from one or more data sources and can return them in a tamper-evident envelope, such as an attribute statement in a signed SOAP message. One implementation of SAR checks if the requester is authorized to make the request for attributes and/or checks if the requester is authorized to receive each returned attribute from the request.

Client 902, which could be an OpenID Provider, requests attributes. The request could be for a specific set of attributes or all attributes known about a specific entity. An X.509 identifier, such as a Distinguished Name (DN) issued by a known certification authority, known to the SAR or SAR data sources, could identify the entity. An example of a shared knowledge environment would be a Privilege Management Infrastructure (PMI). HTTP Interface 904 accepts requests from Client 902. The HTTP Interface 904, which may be omitted, provides an interface capable to negotiate a secure channel, such as TLS or SSL, and may be a web service. In this way, Client 902 may mutually authenticate with the HTTP interface 904 as part of a TLS or SSL 3.0 handshake, that can use an X.509 v3 certificate, and send a SOAP bound SAML attribute query request to the SAML Responder 906. The client certificate may be used to identify the DN that will be used to bind to the data source. SAML Responder 906 communicates using Data Source Connectors 908 to one or more data sources, for example LDAP 910, SQL 912, or others 917. Data source connectors may be operable to select the data store based on the type of attributes requested. SAML Responder 906 creates a cryptographically signed SAML attribute assertion 914 containing the retrieved attributes, which can be sent by HTTP Interface 904 as 916 to Client 902. Use of a signed, tamper-evident, assertion, which may be a protected SAML assertion or a security token, provides higher assurance of the origin and integrity of the attributes, however use of the SAML assertion may be omitted or replaced with some other protocol or mechanism.

Figure 10:
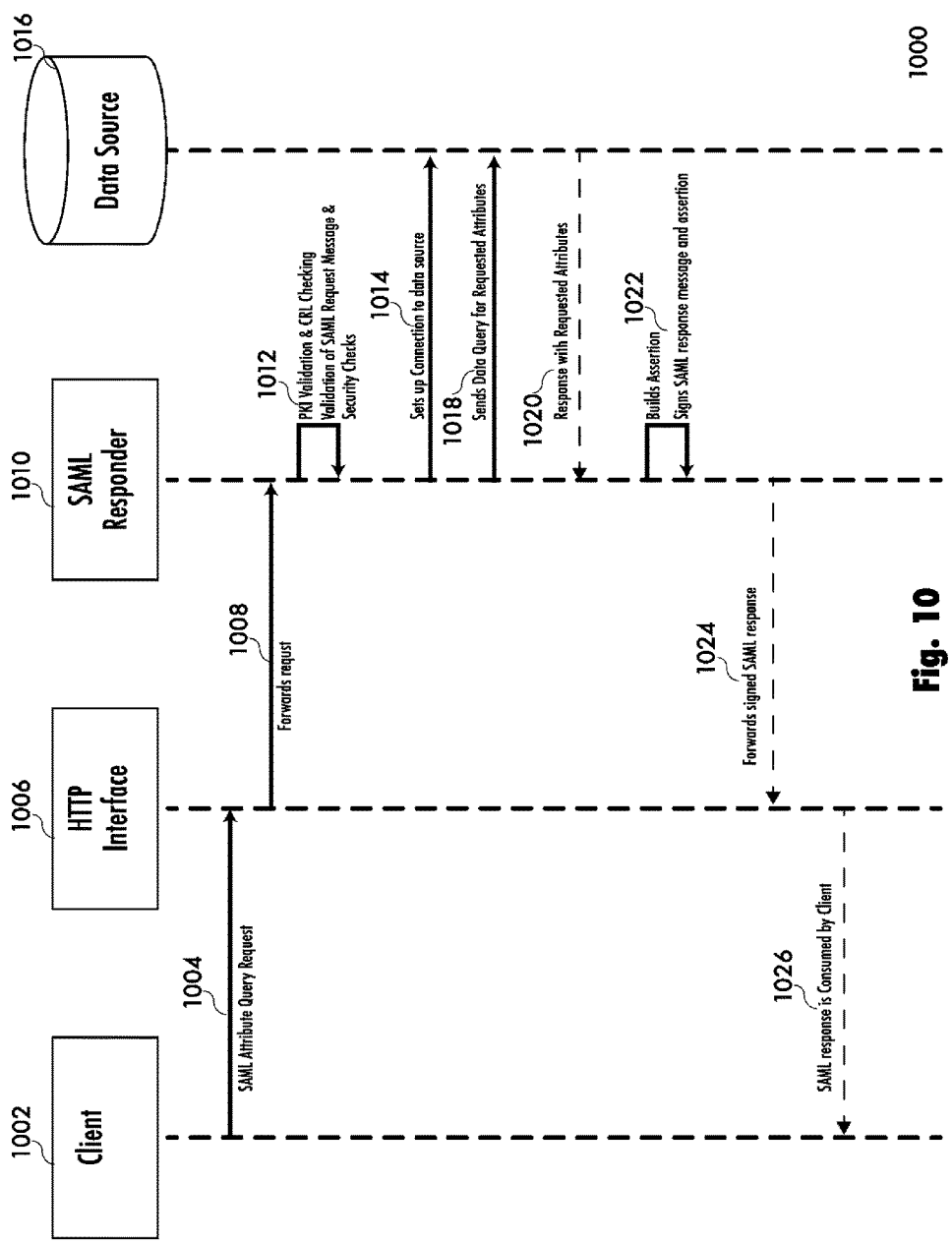
FIG. 10 is a diagram illustrating example exchanges with the SAML Attribute Responder.

A detailed example of data exchange with the SAR is shown in FIG. 10. Client 1002, which may be an OpenID Provider, requests attributes that can use a SAML Attribute Query Request at 1004. HTTP Interface 1006, forwards the request at 1008 to SAML Responder 1010. If a secure token is used in the request, such as protected SAML assertion or SAML token, it is validated, for example using PKI validation and CRL checking on the SAML client X.509 certificate at 1012. Additional methods for validating certificates could be used, such as the Online Certificate Status Protocol (OCSP). SAML Responder 1010 securely connects, if it is not already, at 1014 to one or more data sources, represented as Data Source 1016, which could be a DBMS or gateway to other data sources. A request for attributes is sent at 1018 to Data Source 1016, which returns data at 1020. SAML Responder 1010 builds a SAML assertion including data from data source 1016 and cryptographically signs at 1022. The assertion, which may be tokenized, is forwarded at 1024 to HTTP Interface 1006 for return to Client 1002 at 1026. The SAR optionally includes a component that restricts what attributes can be requested by the client. For example, a requestor without a security clearance asking for all attributes pertaining to a user would not be allowed to query databases requiring a security clearance. Other examples include information on or associated with the certificate used by the client (which made be an OpenID provider), for example attributes, the signing authority, or information retrieved based on identifiers on the certificate. In addition, attributes that are retrieved from the data sources are evaluated to determine if the requester is authorized to receive them. For example, a clinician requesting all medical records on a patient at another hospital might be authorized to search medical databases but not authorized to receive certain data the patient had requested to be kept private. Other examples include information on or associated with the certificate used by the client (which made be an OpenID provider), for example attributes, the signing authority, or information retrieved based on identifiers on the certificate. One or both rule engines may be controlled or owned by different entities and/or operating in different environments, possibly on a different computer systems, servers, or nodes. Policy stores may be local or remote, or a combination thereof.

Figure 11:
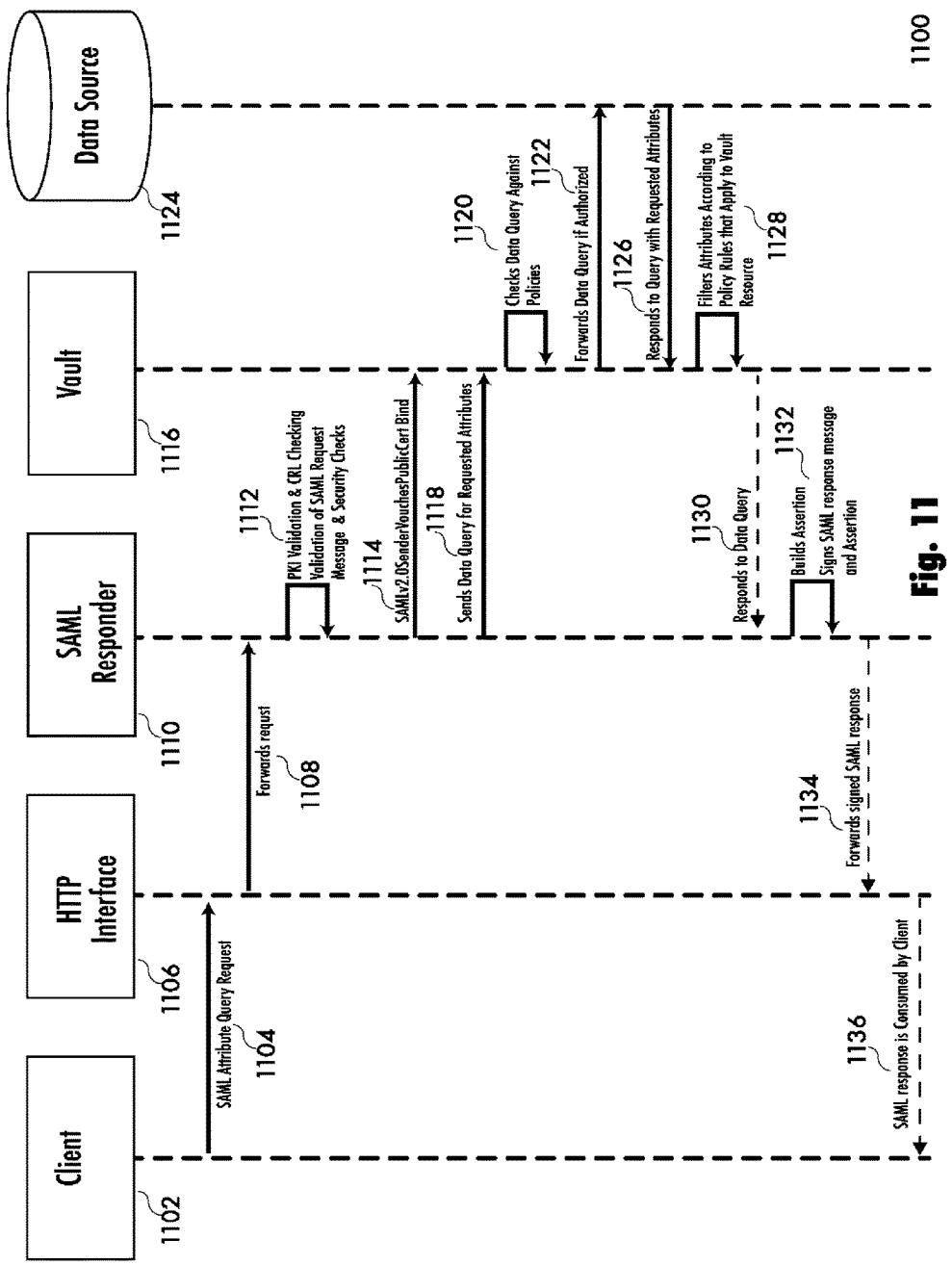
FIG. 11 is a diagram illustrating example exchanges with the SAML Attribute Responder including the vault component.

FIG. 11 shows an examples of additional capabilities discussed above. Client 1102, which may be an OpenID Provider, requests attributes that can use a SAML Attribute Query Request at 1104. HTTP Interface 1106, forwards the request at 1108 to SAML Responder 1110. If a secure token is used in the request, such as a protected SAML assertion or SAML token, it is validated, for example using PKI validation and CRL checking on the SAML client X.509 certificate, at 1112. Additional methods for validating certificates could be used, such as the Online Certificate Status Protocol (OCSP). SAML Responder 1110 securely connects at 1114, if it is not already, and sends the request for attributes at 1118 to Vault 1116. The request is evaluated. Evaluation can use a rules engine at 1120. Available rule engines include JAVA, XACML, Prolog, DTRules, Drools, and ESDS. Factors that may affect the attributes Client 1102 is permitted to query include the attributes, credentials, type, or reputation of the user or Client 1102. Additional factors, such as such as national threat level, time of day, current weather, geographic location, or configuration settings such as level of assurance or user clearance required to access a data source may affect the attributes that can be requested. Requests for attributes that are permitted by the rules engine are sent at 1122 to Data Source 1124, which can represent multiple databases, a DBMS, or a gateway to other data sources. Data Source 1124 returns data at 1126, which is evaluated against authorization rules by Vault 1116. Attributes returned from allowed data sources are reviewed to determine if Client 1102 is permitted to receive them at 1128. Vault 1116 securely sends permitted attributes to SAML Responder 1110 at 1130. SAML Responder 1110 builds a SAML assertion from the data source response and cryptographically signs at 1132. The assertion, which may be tokenized, is forwarded to HTTP Interface 1106 at 1134 for return at 1136 to Client 1102, which may be an OpenID provider.

Benefits of the system described above are magnified when integrated into an overarching PKI infrastructure, which can span multiple security domains. Smart card-based authentication using PKI uses standard formats such as X.509 for encoding digital certificates or attribute certificates. Semantic interoperability can be achieved, for example, by using similar X.509 directory hierarchies between trusted certificate authorities. Thus X.509 identifiers, such as DN or e-mail component can be used to identify related attributes in a trusted data store. For example, the use of X.509 in an LDAP-compliant data store provides attributes related to the entity with the DN as well as the organizational unit that the name is hierarchically associated with. That is, the distinguished name from a digital certificate on a smart card could identify a corresponding DN in an LDAP-compliant data source. Attributes or roles associated with the entity's organization in the LDAP-compliant data source could, for illustration, include attribute values such as logistics, NATO, employee, and auditor. These user-related attributes can be formulated into a tamper-evident SAML assertion signed by a trusted entity, such as the SAR. When a RESTful service validates a ST issued by the component labeled the Relying Party, the additional attributes from the X.509 directory can be included for use by the service.

For example, a request to access shipping information through a RESTful service might require an organizational attribute "logistics" during the authorization of the authenticated user. During the validation of the proffered ST, the signed SAML assertion encoding the LDAP attributes is returned using the back channel. The attribute values in the SAML assertion can be traced to the trusted LDAP and its use of the signed digital certificate read from the smart card during the multifactor authorization step. Therefore the possession of the required logistics attribute value by the user is assured (to the level of trust of the underlying infrastructure). The authorization process can identify the request by the user as appropriate at least in part on possession of the returned additional attributes without requiring further interaction with the user. Other attribute, role, and privilege information could be used.

Attributes sent over a back channel during authentication to a RESTful service can be applied to blue force tracking. Military forces in the field use mobile devices that request the location of friendly forces in their general area to prevent fratricide. Attributes about the requestor, such as unit location, secrecy of their current mission, types of weapons carried, and regional threat status may be needed to decide the correct response but are too sensitive to exchange over a RESTful service call. Use of a back channel exchange allows sending of sensitive information known about the user without exposing that information outside of a controlled network. This is an example of the general case of information being too sensitive for front channel exchange.

Attributes sent over a back channel during authentication to a RESTful service can provide delegation capabilities. Consumers may want to purchase merchandise or services through a delegate, such as website that offers merchandise or services from other merchants. The consumer can use an authentication profile, for example OpenID, to authenticate to the website, which may be a Secured Website implemented using AJAX. A request to a merchant made from the Secured Website to a RESTful service will receive information known about the requestor, including credit card information, using the back channel exchange. Because the credit card information was not sent in the RESTful service request, the delegate (website that offers merchandise or services from other merchants) will not know the credit card account information.

Attributes sent over a back channel during authentication to a RESTful service can be applied to eVoting. Voters in remote locations, for example soldiers, may use mobile devices to cast votes. The voter can use an authentication profile, for example OpenID, to authenticate to the voting website over a RESTful web service. Additional attributes related to the user, such as social security number (SSN) or voter registration number will be sent over the back channel. The personal identifiers are not exposed over the front channel and can be cryptographically signed to ensure integrity and issuer name. The approach allows information required for voting to be exchanged without passing the information in the RESTful service request.

Attributes sent over a back channel during authentication to a RESTful service can be applied to access to electronic health records. Clinicians may wish to access records held by a remote provider over a RESTful interface, for example using a mobile device. Access to medical records may require certain roles, hospital privileges, and/or licensure. The institution receiving the request will receive the required attributes from the back channel exchange, allowing a greater trust in the trustworthiness of the information. Sources of license information, for example, include state medical licensing entities, emergency care certification entities, and medical provider certification boards. This allows the attributes to be used to decide if the clinician is authorized to view the records. Other examples include the exchange of insurance information without risking medical identity theft or the exchange of attributes and/or roles, such as described in ASTM E1986-09, "Standard Guide for Information Access Privileges to Health Information" Table 1 and 2, respectively. Those tables are hereby incorporated herein by reference. Attributes sent over a back channel during authentication to a RESTful service can be applied to preserving or enhancing personal privacy. A user of a protected RESTful service may not want to provide their credentials for privacy reasons. An example can be fear of retaliation for participating in a political discussion, fear of exposing membership in a discriminated social group, fear of submitting a complain, etc. A component, such as a Secure Website, for example as described above, could supply credentials to a RESTful service. The requirement to provide credentials of a certain strength, for example PKI credentials, would be met but the user's identity would be protected.

Attributes related to health care in ASTM E1986-09 include roles held by data users. Examples include attributes grouped by categories such as nurse, pharmacist, and physicians. These categories include subcategories, for example the category "physician" includes chiropractor, pathologist, and psychologist. These roles can be identified using object identifiers (OIDs) and can be mapped to SNOMED CT identifiers. Such standardized attributes allow a meaningful exchange of information across the back channel and can be applied to similar standardized attributes in other fields. ASTM E1633-08a, "Standard Specification for Coded Values Used in the Electronic Health Record," provides an additional example. Coded values categories in ASTM E1633-08a, such as Confidentiality Status have subcategories such as AIDS patient, HIV patient, and Psychiatric patient provide attributes that should be exchanged across a back channel to ensure sensitive information is not exposed, expose of which can trigger fines due to breech laws. Other attributes used in the field of medical information technology are widely known (see: U. S National Library of Medicine, Source Vocabularies, 2012AA Release), including: SNOMED CT, DSM-IV, ICD-9, ICD-10, MeSH, LOINC, RxNorm, and X12.

CAC attributes useful for authentication and authorization are found in NIST IR 6887, Appendix D—DoD Common Access Card (CAC) Data Model. Appendix D is hereby incorporated herein by reference. Department of Defense directory attributes useful for authentication and authorization are found in DoD Enterprise Directory Services Capability, Contact Attributes Specification (Jul. 14, 2009), which is incorporated herein by reference.

The authentication and authorization techniques described herein do not have to be executed at the first use of a RESTful service. Authentication and authorization may be achieved differently but behavior of the user, activity of the user, external events, time-related events, or other conditions may require stronger authentication of the user. This requirement to raise the assurance level of a session could employ the authentication and authorization techniques described herein, for example by requiring the user to provide a smart card to continue communications to a RESTful service based on changing conditions, such as a request to access restricted data. The components and related infrastructure described above can be implemented in many ways. Users can communicate as described with any of several available web browsers, for example Firefox, Google Chrome, Internet Explorer, Opera, or Safari. Mobile devices may use operating systems, for example Android (Google Inc.), BlackBerry OS (Research In Motion Ltd.), iOS (Apple Inc.), Symbian OS (Nokia Inc.), Windows Phone (Microsoft Inc.), and Brew (Qualcomm). Communication may use the Hypertext Transfer Protocol (HTTP) that can be over TLS or SSL, also known as the Hypertext Transfer Protocol Secure (HTTPS) protocol. Users may also use non-browser custom applications that support redirection over the HTTPS or the HTTP protocols. Additionally, alternative protocols to HTTP or HTTPS can be used, such as SPDY or SCTP. Requests for RESTful services can be made from mobile devices, such as phone, laptops, personal digital assistants, or similar devices.

RESTful services or web sites may be made available over computer networks using general-purpose computer servers and common operating systems. Examples of operating systems include: Unix, FreeBSD, Linux, Solaris, Novell NetWare, Mac OS X, Microsoft Windows, OS/2, TPF, and eComStation. RESTful services, web sites, authentication components, and authorization components discussed herein can be executed in application server environments, servlet containers, or custom system software. Many computing platforms are available, such as the Java Platform, Enterprise Edition (J2EE) that can support application server environments. Examples include: GlassFish (Oracle Corp.), WebSphere (IBM Corp.), JBoss (Red Hat), and Apache Geronimo (Apache Software Foundation). Many servlet containers are available, such as Jetty (Eclipse Foundation), Apache Tomcat (Apache Software Foundation), and Tiny Java Web Server (TJWS). Other computing platforms and applications are available and can be substituted.

Figure 12:
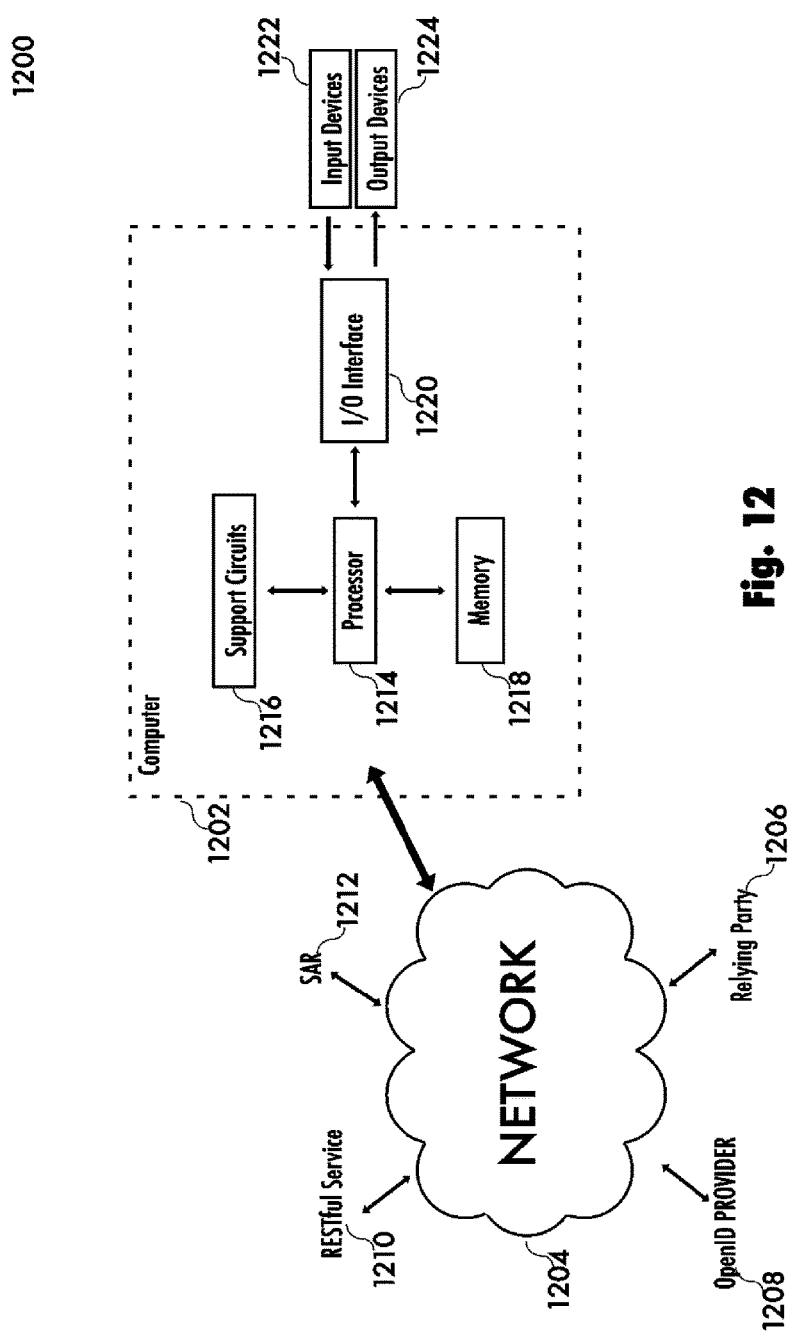
FIG. 12 shows an example representation of computer hardware described in the specification.

FIG. 12 shows an example representation of computer hardware 1202 capable of supporting the component in previous figures. Computers, or computing devices, may include one or more processors 1214 with supporting circuits 1216, operable to access memory 1218. I/O interface 1220 permits communication with input devices 1222 and output devices 1224 such as keyboards, monitors, smart card readers, fingerprint readers, USB drives, etc. Computer 1202 communicates to one or more networks 1204 using protocols, for example Transmission Control Protocol (TCP), Datagram Protocol (UDP), and SCTP. Components that may communicate with computer 1202 through network 1204 include Relying Party 1206, OpenID Provider 1208, RESTful Service 1210, and SAR 1212. Other hardware architectures, such as special-purpose appliances or embedded systems, and additional features known to those skilled in the art are possible.

Figure 13:
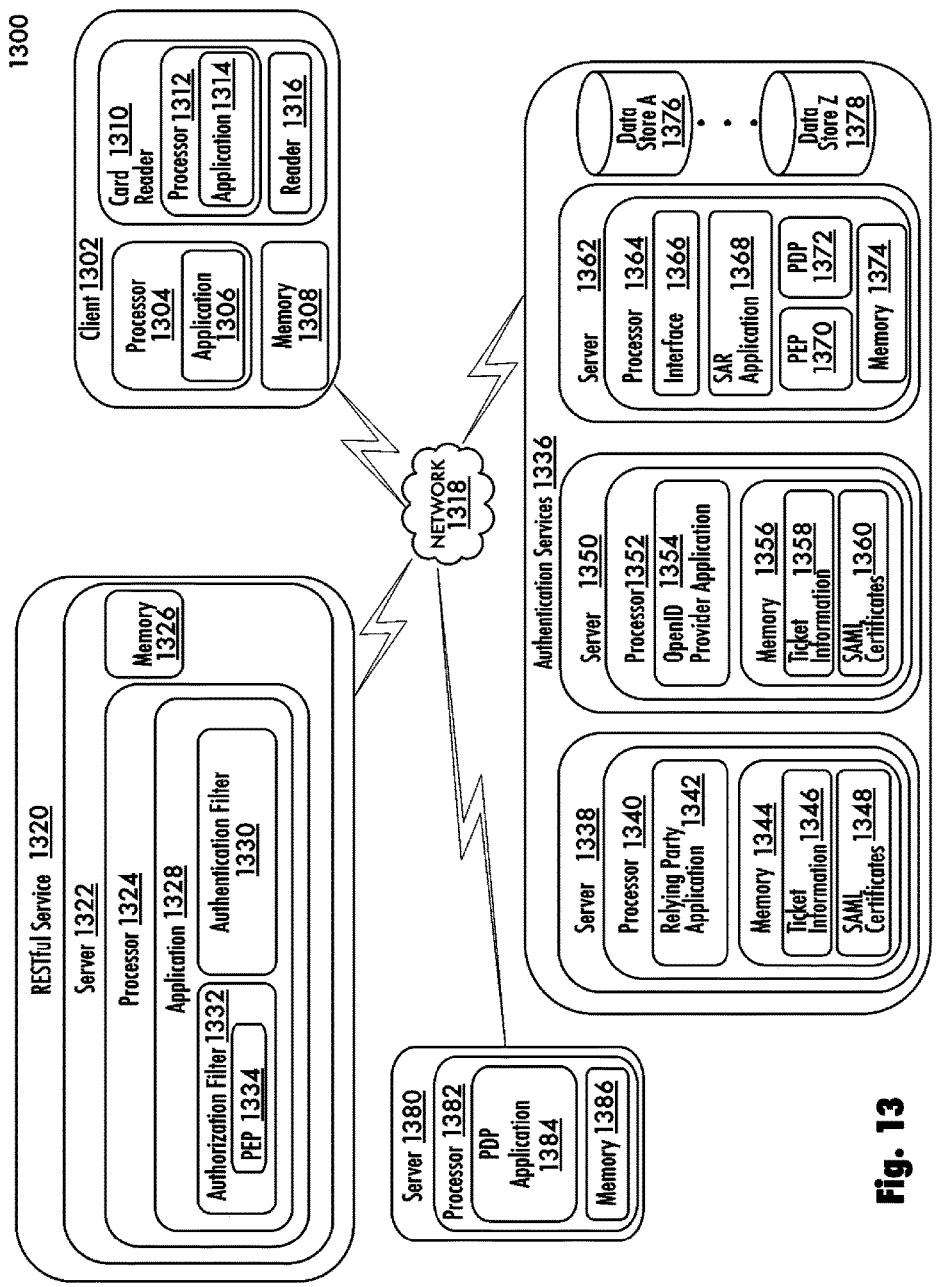
FIG. 13 shows an example of components in an implementation of the authentication/authorization system.

FIG. 13 shows an example of components in an implementation of the authentication/authorization system. Client 1302 is depicted as having processor 1304 and available memory 1308 specifically configured and operable to execute computer-executable instructions associated with application 1306. Multiple processors can be used. Additionally, although a single memory 1308 is shown for the client 1302, a wide variety of types and combinations of memory may be employed, such as random access memory (RAM), virtual memory, solid state memory, removable medium memory, rotating media memory, and other types of computer-readable media. Card reader 1310 is accessible to client 1302 and comprises processor 1312 specifically configured and operable to execute computer-executable instructions associated with application 1314. Reader 1316 can by physically integrated into card reader 1310 or separately attached. Client 1302 is shown able to communicate through network 1318 to RESTful service 1320.

RESTful service 1320 is comprised of server 1322, which can be multiple servers, part of a server farm, virtual servers, or cloud services. Server 1322 is depicted as having processor 1324 and available memory 1326 operable to execute computer-executable instructions associated with application 1328. Multiple processors can be used. Although a single memory 1326 is shown for server 1302, a wide variety of types and combinations of memory may be employed, such as random access memory (RAM), virtual memory, solid state memory, removable medium memory, rotating media memory, and other types of computer-readable media. Application 1328 is depicted as having authentication filter 1330 and authorization filter 1332. PEP 1334 is a software component integrated into, or called from, authorization filter 1332.

Authentication Services 1336 is depicted as a collection of servers configured to provide specific capabilities. Although each capability is shown on a separate server, two servers or one server could be used. Alternatively, multiple servers could be used for one or more of the capabilities comprising the authentication services. One or more servers may be under the control or ownership of one or more different organizations, examples include: credit bureaus, insurance agencies, healthcare providers, state or national government agencies, political organizations, commercial organizations, etc.

Server 1338 comprises processor 1340, which could be implemented with multiple processors. Processor 1340 and available memory 1344 are specifically configured and operable to execute computer-executable instructions associated with relying party application 1342. As part of the execution of relying party application 1342, ST and TGT ticket information 1346 and SAML certificates 1348 can be supported by memory 1344. Although a single memory 1344 is shown for the server 1338, a wide variety of types and combinations of memory may be employed, such as random access memory (RAM), virtual memory, solid state memory, removable medium memory, rotating media memory, and other types of computer-readable media. This is also true for memory 1356 and memory 1374, discussed below. Server 1350 comprises processor 1352, which could be implemented with multiple processors. Processor 1352 and available memory 1356 are specifically configured and operable to execute computer-executable instructions associated with OpenID provider application 1354. As part of the execution of OpenID provider application 1354, ST and TGT ticket information 1358 and SAML certificates 1360 can be supported by memory 1356.

Both server 1350 and server 1338 are able to communicate to network 1318, allowing communication with client 1302. Server 1338 can use network 1318 to communicate to authentication filter 1330. Server 1362 can use network 1318 but that is not required as long as server 1362 can communicate to both server 1350 and data stores. FIG. 13 depicts multiple data stores indicated by the ellipsis connecting data store A 1376 and data store Z 1378, however multiple data stores are not required. Data stores are not required to be in the same physical space as each other or server 1362. Data stores may be under the control or ownership of one or more different organizations, examples include: credit bureaus, insurance agencies, healthcare providers, state or national government agencies, political organizations, commercial organizations, etc. However data stores must be able to communicate with server 1362.

Server 1362 comprises processor 1364, which could be implemented with multiple processors. Processor 1364 and available memory 1374 are specifically configured and operable to execute computer-executable instructions associated with HTML interface 1366, SAR application 1368, PEP 1370, and PDP 1372 PEP 1370 is a software component integrated into, or called from, SAR application 1368. PEP 1370 communicates with PDP 1372, which can be embedded on the same server (as shown) or on another server (as depicted, for example, in PDP 1382 on server 1380 used by PEP 1334).

Server 1380 comprises processor 1382, which could be implemented with multiple processors. Processor 1382 and available memory 1386 are specifically configured and operable to execute computer-executable instructions associated PDP 1384. As depicted, server 1380 communicates to server 1322 through network 1318. However, PDP 1384 could instead be on server 1322 (similar to PEP 1370, and PDP 1372 on server 1362).

As described above, in a different implementation SAR application 1368 would not be used and data sources depicted as exemplary data stores A 1376 and Z 1378 would be accessed from server 1350. Other implementations are possible.

One or more credentials sent over a back channel during the authentication of a user to a RESTful service can elevate the trust the recipient system can place in the user's identity. The addition of an identity credential of higher strength can increase confidence in user identities electronically presented with a lower strength credential. Credential strength requirements for access to sensitive information from various entity environments are described in DoD Instruction (DoDI) 8520.03. The DoDI 8520.03 figure entitled "Minimum Credential Strengths for Authentication to Information Systems" is reproduced herein as Table 5.

Credential strength is a characteristic of an identity credential that indicates the resistance of the identity credential to forgery or fraudulent use, taking into account the strength of the identity credential technology, the rigor of the identity proofing performed prior to issuance of the identity credential, and the protections incorporated into the process for issuing and managing the identity credential's life cycle. (DoDI 8520.03, p. 14) As shown in Table 5, credential strength required to access information at different sensitivity levels varies with regard to the environment from which the entity authenticates, i.e. the entity environment. Identity credentials comprise hardware or software tokens that include identity information asserted by the credential issuer. Examples of identity credentials include SAML tokens, JSON Web Tokens (JWT) and other software or hardware tokens.

The strength of credentials may be determined under the guidelines of the Identity, Credential, & Access Management (ICAM) program. Certified credential issuers are approved under the ICAM procedures and are periodically audited to ensure compliance. As an example, OpenID credentials have been certified for e-authentication level of assurance 2, which is equivalent to a DoDI 8520.03 credential strength of "A." Similarly, SAML assertions have been certified for use up to level of assurance 4. Additional information on assurance levels is described in NIST Special Publication 800-63-1 (SP 800-63).

TABLE 5

Minimum Credential Strengths for Authentication (DoDI 8520.03)

| | Entity Environment | | | | | |
|---|---|---|---|---|---|---|
| | Untrusted | User Managed | Partner Managed | DoD Managed | DoD Network | Classified Partner Network | Classified DoD Network |
| Classified 7 | | | | | | H | H |
| Classified 6 | | | | | | G | G |
| Classified 5 | | | | | | F | F |
| Admin Accounts | | | E | E | E | H | H |
| Unclassified 4 | | | E | E | E | | |
| Unclassified 3 | | D | C | C | B | | |
| Unclassified 2 | | D | B | B | A | | |
| Unclassified 1 | A | A | A | A | A | | |

Key
Letters indicate minimum credential strength to be used for each combination of the entity environment and sensitivity level As shown in Table 5, a requester (which could be a person or a non-person), using a computing asset owned and managed by a DoD mission partner, can access information at a sensitivity level 1 using an OpenID credential (returned with the ST) having a credential strength of "A." A security policy based on DoDI 8520.03 will allow the requester access to, for example, the individual's own medical record. However, access to the medical records of multiple individuals is information with a sensitivity level of 3, so access to that information requires use of credential strength of "C." A properly prepared SAML assertion containing identity attributes sent over the back channel during authentication can have the credential strength of "C." Therefore, use of the SAML credential passed during the back channel validation can be used to raise the overall credential strength to "C," allowing access to information not previously available using just the OpenID credential.

Figure 14:
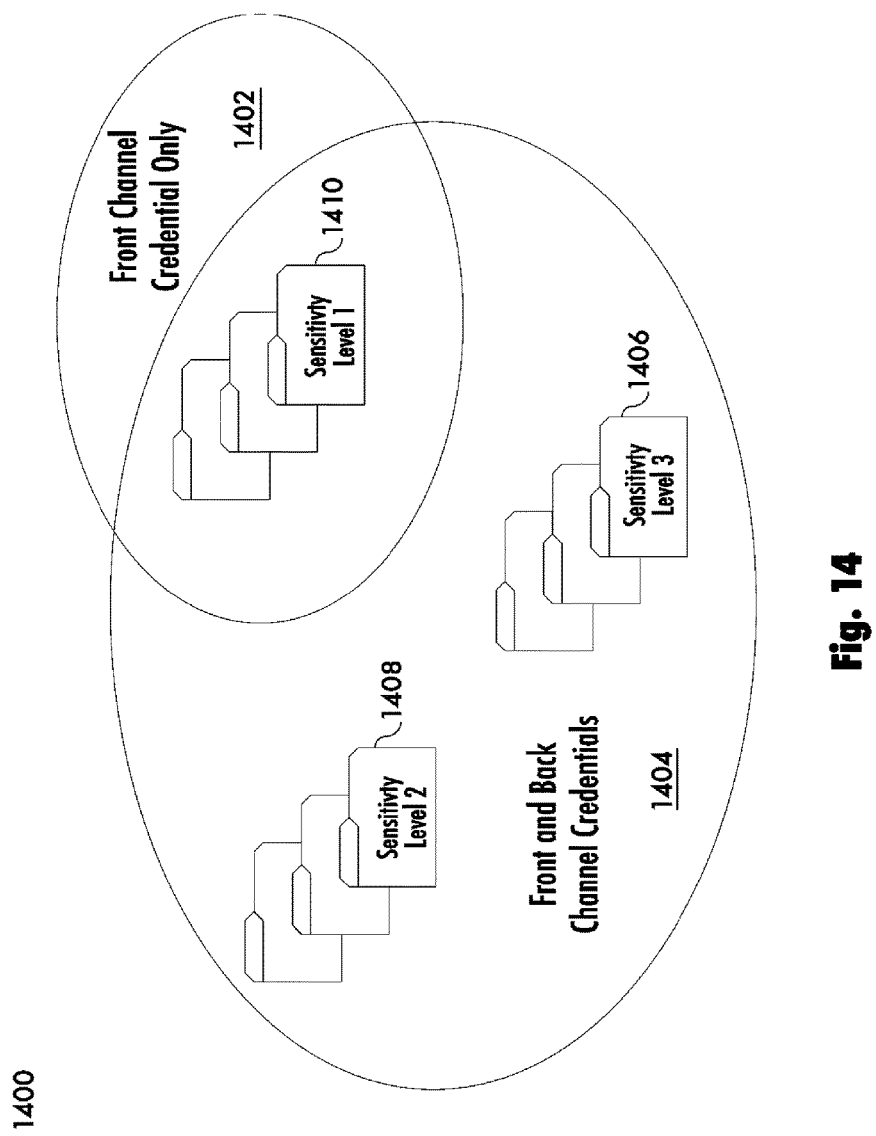
FIG. 14 shows an example of increased access to varied classifications of sensitive information based on the strength of credentials used during authentication.

FIG. 14 shows an example representation illustrating increased access to information of varied sensitivity levels using the approach discussed above. Area 1402 encloses the information available to the user authenticated with a front channel credential only. Area 1404 encloses information of additional sensitivity levels made available by combining the front channel credential presented to the RESTful service with the back channel credential. Applying our example, a user authenticated with an OpenID with credential strength "A" (returned with the ST) will be permitted by a security policy based on DoDI 8520.03 to request access to information 1410 at sensitivity level 1. A user authenticated with a front channel OpenID credential presented to the RESTful service combined with a SAML back channel credential will be permitted to request access to information having sensitivity levels of 1 (1410), 2 (1408), and 3 (1406).

An additional example of the effect of elevating trust in user identity during RESTful authentication is described below. A user is in an unclassified entity environment using a computing asset that is owned or operated on behalf of the DoD, but not physically connected to a DoD network ("DoD Managed," in Table 5). The user authenticates by electronically presenting a front channel OpenID credential to a RESTful service. The OpenID credential is in compliance with the technical requirements for e-authentication assurance level 2 as described in SP 800-63 and is determined to have a DoDI 8520.03 credential strength "A." At that credential strength, an individual is authorized under DoDI 8520.03 to request access to their DoD training record, which is information classified as sensitivity level 1. Users authenticated only with a credential strength of "A" are not authorized under DoDI 8520.03 to request access to DoD personnel management systems, which is information classified as sensitivity level 3. In this example, the authenticated user requests access to a DoD personnel management system. The user is prompted for additional authentication information, for example correct answers to questions only the user would have knowledge of such as high school attended, favorite model of car, favorite book, etc. Electronic presentation of the OpenID credential and knowledge-based answers provide multi-factor remote network authentication allowing use of the NIST assurance level 3-compliant SAML assertion that was returned during the validation of the OpenID credential. In this example, the SAML credential is determined to have a credential of strength "C." Assuming the user has suitable privilege, the request for access to a DoD personnel management system is allowed. In this scenario, the user might then perform a DoD personnel management system function, for example reviewing the training records of other individuals.

Compliance with DoDI 8520.03 and SP 800-63, as described in the examples above, are not required for elevating trust in user identities during RESTful authentication. Reference to DoDI 8520.03 and SP 800-63 provide a framework in which to demonstrate authentication assurance principles. The concepts herein can be used in many applications and does not depend on the use of any specific credential or token.

What is claimed is:

1. A computer-implemented method for authorizing an entity to access a protected resource, said method comprising:
   receiving at a RESTful service implemented at a first server having a first processor and first memory a request by the entity to access the protected resource;
   providing an indication of the request to a relying party implemented at a second server having a second processor and second memory that facilitates entity authentication;
   receiving, at the RESTful service, a first credential transmitted upon a front channel;
   receiving, at the RESTful service, a second credential comprising a SAML credential transmitted upon a back channel;
   authenticating the entity based upon the first and second credentials, respectively; and
   authorizing the entity, once authenticated, to access the protected resource based upon attributes contained in the SAML credential that comprises the second credential.

2. The method of claim 1 wherein said authenticating comprises authenticating the entity based upon credential strengths of the first and second credentials.

3. The method of claim 1 wherein said providing the indication comprises redirecting the request to the relying party.

4. The method of claim 1 further comprising storing the first credential and the second credential at the relying party.

5. The method of claim 4 wherein said receiving the first credential comprises receiving the first credential from the relying party.

6. The method of claim 4 wherein said receiving the second credential comprises receiving the second credential from the relying party.

7. The method of claim 1 wherein the second credential transmitted upon the back channel is transmitted in encrypted form.

8. The method of claim 1 wherein the first credential comprises a CAS credential.

9. A computer-implemented system for authorizing an entity to access a protected resource, said system comprising:
   a RESTful service implemented at a first server having a first processor and first memory and operable to:
   receive a request by the entity to access the protected resource;
   provide an indication of the request to a relying party implemented at a second server having a second processor and second memory that facilitates entity authentication;
   receive a first credential transmitted upon a front channel;
   receive a second credential comprising a SAML credential transmitted upon a back channel;
   authenticate the entity based upon the first and second credentials, respectively; and authorize the entity to access the protected resource based upon attributes contained in the SAML credential that comprises the second credential.

10. The system of claim 9 wherein said RESTful service is operable to authenticate the entity based upon credential strengths of the first and second credentials.

11. The system of claim 9 wherein said RESTful service is operable to provide the indication by redirecting the request to the relying party.

12. The system of claim 9 wherein said RESTful service is further operable to store the first credential and the second credential at the relying party.

13. The system of claim 12 wherein said RESTful service is operable to receive the first credential from the relying party.

14. The system of claim 12 wherein said RESTful service is operable to receive the second credential from the relying party.

15. The system of claim 9 wherein the second credential transmitted upon the back channel is transmitted in encrypted form.

16. The system of claim 9 wherein the first credential comprises a CAS credential.

* * * * *